(12) United States Patent
Uno

(10) Patent No.: US 7,386,072 B2
(45) Date of Patent: Jun. 10, 2008

(54) ORTHOGONAL FREQUENCY DIVISION MULTIPLEXING (OFDM) SYSTEM WITH CHANNEL TRANSFER FUNCTION PREDICTION

(75) Inventor: Masahiro Uno, Fellbach (DE)

(73) Assignee: Sony Deutschland GmbH, Cologne (DE)

( * ) Notice: Subject to any disclaimer, the term of this patent is extended or adjusted under 35 U.S.C. 154(b) by 720 days.

(21) Appl. No.: 10/413,687

(22) Filed: Apr. 15, 2003

(65) Prior Publication Data

US 2003/0232601 A1 Dec. 18, 2003

(30) Foreign Application Priority Data

Apr. 16, 2002 (EP) .................................. 02008586

(51) Int. Cl.
*H04L 27/06* (2006.01)
(52) U.S. Cl. .................. 375/344; 375/298; 375/260; 370/204; 370/208
(58) Field of Classification Search ................ 375/344, 375/298, 260; 370/204, 208
See application file for complete search history.

(56) References Cited

U.S. PATENT DOCUMENTS 5,479,447 A * 12/1995 Chow et al. .................. 375/260
2003/0193889 A1* 10/2003 Jacobsen .................... 370/208

FOREIGN PATENT DOCUMENTS

WO WO 01 08369 2/2001

OTHER PUBLICATIONS

Czylwik, "Adaptive OFDM for wideband radio channels", Global Telecommunications Conference, 1996. GLOBECOM '96 Communications: The Key to Global Prosperity vol. 1, Nov. 18-22, 1996 pp. 713-718 vol. 1.*
Czylwik, "Comparison between adaptive OFDM and single carrier modulation with frequency domain equalization", 1997 IEEE 47th Vehicular Technology Conference, vol. 2, May 4-7, 1997 pp. 865-869 vol. 2.*
Valkanas, "Adaptivity on an OFDM fixed wireless access system", Proceedings of the Thirty-Fourth Southeastern Symposium on System Theory, 2002, Mar. 18-19, 2002 pp. 458-462.*

(Continued)

*Primary Examiner*—Mohammed Ghayour
*Assistant Examiner*—Juan Alberto Torres
(74) *Attorney, Agent, or Firm*—Oblon, Spivak, McClelland, Maier & Neustadt, P.C.

(57) ABSTRACT

Wireless communication systems are provided with an adaptive subcarrier loading function for a mobile receiver in a wireless communication system based on Orthogonal Frequency Division Multiplexing (OFDM) that can advantageously be applied to predict the channel transfer function of a multipath propagation channel being severely impaired by frequency-selective fading and an extremely time-variant behavior by detecting the position and/or movement of zero points of the transfer function, thereby reducing the probability of incorrect assignment of the modulation scheme for each subcarrier caused by mobile terminals moving at high velocity. The zero points of the estimated channel transfer function are determined by detecting the position of deep notches on the associated amplitude response of the measured channel transfer function caused by frequency-selective fading whose depths are larger than a predefined threshold.

9 Claims, 13 Drawing Sheets

OTHER PUBLICATIONS

Canpolat, "Performance of adaptively loaded OFDM under Rayleigh fading with diversity combining", VTC 2001 Fall, IEEE VTS 54th Vehicular Technology Conference, 2001. vol. 2, Oct. 7-11, 2001 pp. 957-961 vol. 2.*

Grunheid, "A blockwise loading algorithm for the adaptive modulation technique in OFDM systems", VTC 2001 Fall, IEEE VTS 54th Vehicular Technology Conference, 2001, vol. 2, Oct. 7-11, 2001 pp. 948-951 vol. 2.*

Czylwik, "Degradation of multicarrier and single carrier transmission with frequency domain equalization due to pilot-aided channel estimation and frequency synchronization" IEEE Global Telecommunications Conference, 1997. GLOBECOM '97, vol. 1, Nov. 3-8, 1997 pp. 27-31 vol. 1.*

Thoen S et al: "Predictive Adaptive Loading for Hiperlain II" VTC 2000-Fall. IEEE VTS 52nd. Vehicular Technology Conference. Boston, MA, Sep. 24-28, 2000, IEEE Vehicular Technology Conference, New York, NY: IEEE, US, vol. 5 of 6. Conf. 52, Sep. 24, 2000, pp. 2166-2172, XP000988402.

Souryal, M. R.; Pickholtz, R.L.: "Adaptive Modulation With Imperfect Channel Information in OFDM" Communications, 2001. ICC 2001, IEEE International Conference On, vol. 6, Jun. 11-14, 2001. pp. 1861-1865, XP002213933.

Munster M et al: "Co-Channel Interference Suppressin Assisted Adaptive OFDM in Interference Limited Environments" VTC 1999-Fall. IEEE VTS 50th. Vehicular Technology Conference. Gateway to the 21st. Century Communications Village. Amsterdam, Sep. 19-22, 1999, IEEE Vehicular Technology Conference, New York, NY: IEEE, US, vol. 1 Conf. 50, Sep. 19, 1999, pp. 284-288, XP002143788.

Eyceoz T et al: "Deterministic Channel Modeling and Long Range Prediction of Fast Fading Mobile Radio Channels" IEEE Communications Letters, IEEE Service Center, Piscataway, US, US, vol. 2, No. 9, Sep. 1, 1998, pp. 254-256, XP000784809.

* cited by examiner

201: BPSK

202: QPSK

203: 16QAM

204: 64QAM

ORTHOGONAL FREQUENCY DIVISION MULTIPLEXING (OFDM) SYSTEM WITH CHANNEL TRANSFER FUNCTION PREDICTION

BACKGROUND OF THE INVENTION

The underlying invention generally relates to the field of wireless communication systems with high-speed mobile access, especially to Orthogonal Frequency Division Multiplexing (OFDM) systems considering channel estimation and/or channel tracking. More particularly, the invention provides an adaptive subcarrier loading function for a mobile receiver in a wireless communication system based on OFDM that can advantageously be applied to predict the channel transfer function H(j·ω,t) of a multipath propagation channel being severely impaired by frequency-selective fading and an extremely time-variant behavior by detecting the position and/or movement of zero points of said transfer function H(j·ω,t), thereby reducing the probability of an incorrect assignment of the modulation scheme for each subcarrier, that is caused by mobile terminals moving at high velocity.

The development of wireless communication systems for high bit-rate data transmission and high-quality information exchange between terminals in indoor and outdoor environments is becoming the new research challenge in telecommunication area. Possible applications are mobile cellular systems, the Wireless Local Area Network (WLAN), the Wireless Local Loop (WLL), and others. In this connection, the underlying research activity aims at the performance evaluation of an adaptive multi-carrier modulation scheme (Adaptive Orthogonal Frequency Division Multiplexing, AOFDM) for wireless broadband indoor modems. The framework of AOFDM is the European project "WIND-FLEX" that aims to design and demonstrate a high-bit-rate flexible and configurable modem architecture, that provides wireless access to the Internet in an indoor environment where slow mobility is required (about 1 m/s). The system scenario is the one typical for domestic environments with a short range (within 20 meters). This scenario could be characterized by a set of terminals that needs to exchange data and to communicate with the external world. The requested modem platform has then to support different kinds of services, voice, data or video, with the possibility of transmitting both in a synchronous (for real-time applications) and an asynchronous way. A modem requirement is the capability of supporting variable bit rates in the range of 64 kBit/s to 100 MBit/s of payload, in order to create a multi-technological platform, available for different applications.

The frequency band around 2.4 GHz and 5 GHz have already been used by other wireless transmission standards, such as IEEE-802.11 and HiperLAN/2 and are close to saturation. For the WIND-FLEX system, the expectation of the 17 GHz unlicensed frequency band seems to be a promising and challenging solution. The whole available spectrum (17.1 to 17.3 GHz) will be divided into four 50 MHz-width channels, which are not simultaneously selectable. The considered AOFDM modulation scheme has been designed to efficiently transmit in one of these channels.

Before examining the applied transmission systems according to the state of the art, it is necessary to briefly describe the characteristics of the channel distortions mobile communication is faced with. Wireless environments are characterized by a variety of factors that severely impede reliable communication over a mobile radio channel. In general, the sources of degradation can be grouped into two categories: channel impairments and noise sources. On the one hand, a broadband radio channel, as needed for the transmission of high data rates, is characterized by severe attenuation fades (frequency-selective fading) caused by multipath propagation of the transmitted mobile radio signals. On the other hand, it exhibits a time-variant behavior due to the mobility of the receiver, which possibly requires a continuous adaptation of the transmission system to said behavior. Thereby, despite a plurality of differences, most wireless links share two common characteristics, time dispersion and time variability, which shall briefly be described in the following sections.

Wireless links can be described by the presence of multiple signal paths between the transmitter and the receiver. These multipath components are generated whenever signals are reflected by objects in the environment such as buildings, walls, ceilings, mountains, cars, people, etc. Differences in reflected path lengths cause impulsive signal transmissions to arrive at the receiver with a finite temporal scattering, which is called the root mean square (RMS) delay spread $\Delta$ of the multipath propagation channel. With the aid of $\Delta$, the approximate duration of the channel "echoes" resulting from multipath arrivals can be measured.

Time-dispersive channels generate at least two potentially deleterious effects at the receiver, namely frequency-selective amplitude, phase variations and intersymbol interference (ISI). Frequency-dependent variations are caused by (randomly) delayed signal components adding out of phase at the receiver. Since the spectral location of fades is strongly dependent on the signal phase, the overall channel impulse response is highly sensitive to changes in the location and orientation of the receiver. Meanwhile, ISI occurs whenever delayed arrivals from one symbol interval "spill over" into subsequent symbol intervals. Thereby, ISI impedes the ability of the receiver to distinguish the desired signal from the echoes of previously transmitted symbols. The impact of both channel selectivity and ISI primarily depends on whether the system uses narrowband or wideband signaling.

Wireless channels, like other communication mediums, are subject to time-varying behavior. One of the distinguishing features of wireless links is the magnitude and rate at which these variations occur. An important measure of variability for a wireless channel is the coherence time $T_{coh}$—the interval during which the impulse response of the multipath propagation channel remains correlated. The coherence time $T_{coh}$ can be approximated by the reciprocal value of the Doppler spread $B_D$ using a generalized channel model that explicitly incorporates the channel's time dependence:

$$T_{coh} \approx \frac{1}{B_D}[s] \text{ with } B_D := 2 \cdot f_D[Hz],$$

wherein $f_D$ denotes the Doppler shift of the channel.

Thereby, $T_{coh}$ provides a measure of the rate at which variations in the wireless link occur. Channels are described as "fast fading" or "slow fading" depending on the length of the coherence time $T_{coh}$ relative to a single symbol interval: A slowly changing channel has a large coherence time $T_{coh}$ or, equivalently, a small Doppler spread $B_D$, and vice versa. As can be expected, the channel coherence time $T_{coh}$ is strongly dependent on the rate of motion for the transmitter, receiver, and other objects in the environment. For narrowband signals, the fading rate directly affects the responsivity and dynamic range requirements of the receiver. For wideband systems, the fading rate primarily impacts the required convergence rate for adaptive receiver algorithms. Wireless designs often guarantee adequate performance under "worst-case" conditions, by limiting the achievable performance under more favorable conditions. One solution would be to exploit time-varying channel knowledge to provide optimized time-varying performance. This approach requires both channel estimation and adaptive receiver implementation, but offers the promise of substantial performance gains. Of course, the larger and faster the link variations, the more difficult (and computationally intensive) the tasks of estimation and adaptation become. Hence, the receiver consumes more energy. Because channel modeling is an active area of wireless research, a wide variety of models—both empirical and statistical—have been developed to characterize the channel impairments described above.

In an indoor wireless channel, the dominant impairment is the fading, which is connected with a multipath propagation environment. Thereby, the electromagnetic waves are perturbed by structures, walls and furniture inside the building in such a way that the modulated signal propagates along several paths that connect the transmitter with the receiver. According to the diffuse multipath model, the received signal y(t) can be viewed as the composition of a continuum of signal replicas: When a narrowband signal $$x(t) = Re\{\tilde{x}(t) \cdot e^{j \cdot 2\pi \cdot f_c \cdot t}\}$$

having the complex envelope $\tilde{x}(t)$ and the center frequency $f_c$ is transmitted, the received narrowband signal $$y(t) = Re\{\tilde{y}(t) \cdot e^{j \cdot 2\pi \cdot f_c \cdot t}\}$$

has a complex envelope $\tilde{y}(t)$ which can be expressed by means of the following convolution integral:

$$\tilde{y}(t) = \tilde{x}(t) * h(\tau, t) = \int_{-\infty}^{+\infty} h(\tau, t) \cdot \tilde{x}(t - \tau) d\tau,$$

wherein
  h(τ,t) denotes the time-varying complex baseband impulse response of the underlying multipath propagation channel,
  τ represents the time delay, and
  t represents the observation instant.

It has been shown that the diffuse multipath model can be represented in baseband as a tapped-delay line (TDL) with time-varying complex coefficients and a fixed tap spacing 1/B, where B is the passband signal bandwidth. For practical reasons, the number of taps in the TDL is kept finite, and it is related to the delay spread of the fading channel. The tap gains are scaled according to the Power Delay Profile $$R_c(\tau) \equiv \varphi_h(\tau, \Delta t)|_{\Delta t=0} = \frac{1}{2} \cdot E\{|h(\tau, t)|^2\} = \lim_{T \to \infty} \frac{1}{2 \cdot T} \cdot \int_{-T/2}^{T/2} |h(\tau, t)|^2 dt$$

(using $Z^*Z = Re\{z\}^2 + Im\{z\}^2 = |z|^2 \forall z \in C$)

wherein
  Δt represents the difference in the observation instant t,
  "*" denotes the complex conjugate operation, and
  E{·} denotes the expectation over the time t.

Thereby, the delay cross-power spectral density $\phi_h(\tau, \Delta t)$ is defined as follows:

$$\varphi_h(\tau, \Delta t) \equiv \frac{1}{2} \cdot E\{h'(\tau, t) \cdot h(\tau, t + \Delta t)\} =$$
$$\lim_{T \to \infty} \frac{1}{2 \cdot T} \cdot \int_{-T/2}^{T/2} h'(\tau, t) \cdot h(\tau, t + \Delta t) dt.$$

The Power Delay Profile $R_c(\tau)$ characterizes the fading channel and measures the mean signal power relative to its dispersion across time. Several forms have been suggested for a decaying Power Delay Profile that models different fading channels. For a wide range of a frequencies and environments, including the 17 GHz indoor radio channel, the decaying Power Delay Profile could reasonable be described by an exponential distribution. Therefore, the considered Power Delay Profile is given by $$R_c(\tau) = \begin{cases} \frac{1}{\bar{\tau}} \cdot e^{-t/\bar{\tau}} & \text{for } \tau \geq 0 \\ 0 & \text{otherwise} \end{cases},$$

wherein $\bar{\tau}$ denotes the mean delay. In general, $\bar{\tau}$ is determined by the physical environments, and it is assumed to be about 50 ns for an indoor link at 17 GHz frequency band. The length of the TDL is determined by the delay spread Δ, which is defined as the range of τ for which the delay profile $R_c(\tau)$ is essentially non-zero. The length is therefore given by the nearest integer of Δ·B+1, wherein B is the passband signal bandwidth and Δ can reasonably assumed to be about 200 ns. The tap gains are independent complex Gaussian processes, whose variances are determined according to the Power Delay Profile $R_c(\tau)$.

Since the preferred embodiment of the underlying invention is directed to a pilot-assisted multi-carrier transmission system wherein Adaptive Orthogonal Frequency Division Multiplex (AOFDM) is applied, the basic aspects and principles of OFDM and adaptive loading techniques shall briefly be summarized in the following sections.

Conventional single-carrier modulation methods for the transmission at high symbol rates experience a severe limitation in time-dispersive and frequency-selective channels due to their sensitivity to ISI. To handle ISI, usually the entire bandwidth of the single-carrier signal has to be (adaptively) equalized by quite complex time-domain channel equalizers, e.g. Viterbi equalizers. Thereby, the complexity of a channel equalizer increases with the amount of ISI which has to be eliminated. If a high data rate of about $10^7$ modulation symbols per second is transmitted over a radio channel having a maximum delay $\tau_{max}$ of 10 μs, ISI extending over 100 modulation symbols might arise. For this reason, such an equalizer might be too expensive for an implementation.

If a conventional single-carrier transmission system is applied in an environment with severe transmission conditions, the channel equalization, which is supposed to eliminate the influence of the radio channel as far as possible, can be very extensive. The choice of an appropriate modulation technique for wireless data communication is therefore a critical issue due to the adverse influence of the dispersive and mostly time-variant mobile radio channel. In recent years, the interest in multi-carrier modulation for wireless transmission has been revived, whereas in former times the practicality of this concept appeared to be limited.

A promising approach to multi-carrier modulation which can easily be realized is Orthogonal Frequency Division Multiplexing (OFDM). OFDM offers advantages in transmission over severe multipath channels, so that there is an increased interest in applying OFDM in high-rate mobile or portable data transmission today. OFDM is a powerful technique that can advantageously be employed in communication systems suffering from frequency-selective distortion. Combined with multiple antennas at the transmitter and receiver as well as adaptive modulation, OFDM proves to be robust against channel delay spread. Furthermore, it leads to significant data rates with improved bit error performance over links having only a single antenna at both the transmitter and the receiver.

The main advantage of OFDM is that each sub-channel is relatively narrowband and is assumed to have flat fading. However, it is possible that a given sub-channel has a low power, which results in a large bit error ratio (BER). Thus, it is desirable to take advantage of sub-channels having relatively good performance, which is the motivation for adaptive modulation. In the context of time-varying channels, there is a decorrelation time associated with each frequency-selective channel instance. Thus, a new adaptation must be implemented each time the channel decorrelates. Since the channel is slowly time-varying, the receiver can provide reliable channel state information to its transmitter using a robust feedback channel. For this reason, loading modulation schemes according to the channel response of each subcarrier seems to be an interesting approach for increasing the capacity usage of the channel.

On the assumption that the transmitter knows the instantaneous channel transfer functions of all users simultaneously participating in different mobile communication sessions, many authors have demonstrated that significant performance improvement can be achieved if adaptive modulation is used together with OFDM. Thereby, adaptive modulation is an important technique that yields increased data rates over non-adaptive uncoded schemes. In general, subcarriers with large channel gains employ higher-order modulation to carry more bits per OFDM symbol, while subcarriers in deep fades carry one or even zero bits per symbol. Integrated design of forward error correction (FEC) and adaptive modulation using the Bose-Chadhuri-Hocquenghem (BCH) code and Trellis-Coded Modulation (TCM) has also been studied. Although both coding techniques consider only time-varying flat fading channels, the same coded adaptive modulation design can easily be applied to OFDM systems. As different subcarriers experience different fades and transmit different numbers of bits, the power level of the transmitted RF signal has to be changed accordingly.

When OFDM with adaptive modulation is applied in a frequency-selective fading channel, a significant portion of the subcarriers may not be used. These are typically subcarriers which experience deep fade and are not power-efficient to carry any information bits. In multiuser systems using static Time Division Multiple Access (TDMA) or Frequency Division Multiple Access (FDMA) as multi-access schemes, each user is allocated a pre-determined time slot or frequency band, respectively, to apply OFDM with adaptive modulation. Consequently, these unused subcarriers (as a result of adaptive modulation) within the allocated time slot or frequency band of the respective user are wasted and can not be used by other users. However, those subcarriers which appear in deep fades to one user may not be in deep fade for other users. In fact, it is quite unlikely that a subcarrier will be in deep fade for all users, as the fading parameters for different users are mutually independent. This motivates to consider a so-called adaptive multiuser subcarrier allocation scheme. Thereby, subcarriers are assigned to the users based on instantaneous channel information. This approach will allow all subcarriers to be used more efficiently as subcarriers will only be left unused if they appear to be in deep fade to all users.

The main object of an adaptive subcarrier loading function is to assign the modulation scheme of each subcarrier according to the channel impulse response which can be determined by frequency-selective channel distortion. Thereby, for subcarriers around deep distortions, a lower modulation scheme such as BPSK is assigned, whereas for subcarriers without any severe distortion, a higher modulation scheme—e.g. Quadrature Amplitude Modulation (QAM) with a 16- or 64-point signal constellation—is assigned. For example, the communication system between an access point 401 (AP) and a mobile terminal 405 (MT) capable of executing this function comprises the following steps:

measurement of the channel transfer function $H(j \cdot \omega, t)$, creation of a modulation scheme assignment plan for each subcarrier according to the result of the respective channel impulse response measurement and negotiation between the AP 401 and the MT 405, transmission of a signal by the AP 401 according to the applied modulation scheme assignment plan.

In case an MT 405 is moving at high velocity, the channel transfer function $H(j \cdot \omega, t)$ is changing fast. Compared to the changing of $H(j \cdot \omega, t)$, the time duration between the timing of its measurement and the timing of a transmission according to a new modulation scheme assignment plan should be longer to guarantee a correct assignment. Otherwise, an incorrect assignment of the employed modulation scheme for said subcarriers might occur.

BRIEF DESCRIPTION OF THE STATE OF THE ART

According to the state of the art, there are different solutions to the problem of pilot-pattern-based channel estimation and/or channel tracking available, each of them being optimized to a specific application environment given by the transmission channel. Since the underlying invention is basically dedicated to pilot-assisted multi-carrier systems such as OFDM, it is necessary to briefly describe the main principles and techniques of conventional OFDM systems according to the state of the art.

OFDM techniques are used in several wireless communication systems, e.g. in Wireless Local Area Networks (LANs) such as HiperLAN/2 and IEEE 801.11a. In order to explain the principle of OFDM, the spectrum of an OFDM symbol and the applied modulation schemes for its subcarriers are shown in FIG. 1. In frequency domain, an OFDM symbol 101 is split up into several subcarriers 102. In case of HIPERLAN/2, their number is 52 (with the exception of the component at 0 Hz). Thereby, each subcarrier is modulated by means of a digital modulation technique. There are several modulation schemes that can be applied to each subcarrier of an OFDM symbol, e.g. low-order modulation schemes such as BPSK (M=2) and QPSK (M=4), or high-order modulation schemes like 16-QAM (M=16) and 64-QAM (M=64) as shown in diagrams 201, 202, 203, and 204, which are depicted in FIG. 2. 16-QAM and 64-QAM are able to carry $$b = \log_2(M) = \begin{cases} 4 \text{ Bit} & (16-QAM) \\ 6 \text{ Bit} & (64-QAM) \end{cases}$$

at once, respectively. Thereby, M represents the number of signal points. However, if the signal power is limited, the distance between neighboring signal points on the constellation planes 201, 202, 203, and 204 is reduced. For this reason, compared to low-order modulation schemes, the bit error rate (BER) becomes higher on the same noise or distortion condition (linear or non-linear).

A block diagram for a mobile transmission and reception system supporting wireless communication over a multipath propagation channel 320 with the aid of a pilot-assisted wireless multi-carrier system (here: an OFDM system) comprising means for a channel estimation according to the state of the art is shown in FIG. 3. Thereby, the user data is fed to a channel encoder 303. After that, by using a serial-to-parallel converter 304, the output data of said channel encoder is converted from serial to parallel according to the number of bits per subcarrier in one OFDM symbol. The output of said serial-to-parallel converter 304 is then modulated by a modulator 305, converted from frequency domain to time domain by an Inverse Fast Fourier Transform (IFFT, 306), and then submitted to a digital-to-analog conversion by a digital-to-analog converter (DAC, 307). The output of said DAC 307 is then up-converted to the passband by using an RF block 308, supplied to a transmitting (TX) antenna 309 and radiated to the air.

The radiated signal propagates through several paths (here: the paths 403 and 404), which are modeled as a multipath fading channel 320 that causes frequency-selective distortion.

At an OFDM receiver 310, the received signal is amplified, down-converted to the baseband by another RF block 312 and supplied to an analog-to-digital converter (ADC, 313). The output of said ADC 313 is then transformed from time domain to frequency domain by a Fast Fourier Transform (FFT, 314). Using the output data of said FFT 314, a channel estimator 318 estimates the current channel transfer function $H(j\cdot\omega, t)$ of said multipath fading channel 320.

At a demodulator 315, the output data of said FFT 314 along with the frequency-selective distortion caused by said channel 320 is compensated by using an estimated channel transfer function $\hat{H}(j\cdot\omega, t)$ and supplied to a parallel-to-serial converter 316. The output of said parallel-to-serial converter 316 is then fed to a channel decoder 317, and the user data is derived.

In the following sections, the mechanism of using frequency-selective fading for a prediction of the channel transfer function $H(j\cdot\omega, t)$ shall be explained on the basis of the scenario depicted in FIG. 4, which shows a typical example of a propagation model with one access point 401 (AP) and one moving mobile terminal 405 (MT). Thereby, the transmitted RF signal x(t) is radiated from an antenna 402 of the AP 401. The signal propagates via several paths (here designated with 403 and 404) caused by reflection at mountains, trees, buildings or other objects. At a receiver side—e.g. at an MT 405 in a car which is driving at high speed—, signals coming via said paths 403 and 404 are received and summed at an antenna 406 of the receiver 405. This channel is called a "multipath fading channel" 320. Since the delay time $\tau_i$ of each propagation path i is different, frequency-selective distortion might occur at the MT 405.

The channel impulse response $h(\tau, t)$ of this multipath fading channel 320 is given by $$h(\tau, t) = a_0 \cdot \delta(\tau) + \sum_{i=1}^{n-1} a_i(t) \cdot \delta(\tau - T_i(t)),$$

wherein
i represents the path number (i=0, 1, 2, ..., n−1) between the transmitter and the receiver,
$a_i(t)$ denotes the complex amplitude of the i-th path,
$\tau_i(t)$ denotes the delay time of the i-th path, and
$\delta(t)$ is Dirac's delta function in time domain.

By applying the Laplace transform $\mathcal{L}\{\cdot\}$ on $h(\tau,t)$, the channel transfer function H(s,t) is derived as follows:

$$H(s, t) = \mathcal{L}\{h(\tau, t)\} \int_0^{+\infty} h(\tau, t) \cdot e^{-s\tau} d\tau = a_0 + \sum_{i=1}^{n-1} a_i(t) \cdot e^{-s\tau_i(t)},$$

thereby using $$\mathcal{L}\{\delta(\tau)\} = 1, \mathcal{L}\{c \cdot f(\tau)\} =$$
$$c \cdot \mathcal{L}\{f(\tau)\} \forall c \in \mathbb{R} \text{ and } \mathcal{L}\{f(\tau - \tau_0)\} = e^{-s\tau_0} \cdot \mathcal{L}\{f(\tau)\} \forall \tau_0 \in \mathbb{R},$$

wherein

| | |
|---|---|
| $s := \sigma + j \cdot \omega$ | denotes the complex observation frequency, |
| $\omega = 2\pi \cdot f$ | denotes the angular observation frequency, |
| f | denotes the observation frequency, |
| $j := \sqrt{-1}$ | is the imaginary unit, and |
| $e \approx 2.718281828$ | represents Euler's constant. |

The exponential terms $e^{-s\tau_i}$ (for i=1, 2, 3, ..., n−1) can be expanded by using the following Taylor series:

$$e^{-z} = \sum_{k=0}^{\infty} \frac{(-1)^k}{k!} \cdot z^k =$$
$$1 - z + \frac{1}{2} \cdot z^2 - \frac{1}{6} \cdot z^3 + \frac{1}{24} \cdot z^4 - \ldots + \frac{(-1)^L}{L!} \cdot z^L \pm \ldots \forall z \in C.$$

By applying said Taylor series, the channel transfer function H(s,t) can be described by using a polynomial of m-th order:

$$H(s, t) = \sum_{i=0}^{m-1} b_i(t) \cdot s^i = A \cdot \prod_{i=0}^{m-1} \left(1 - \frac{s}{T_i(t)}\right),$$

wherein
A is a complex amplitude factor, derived by transformation of the equation,
$b_i(t)$ denotes the complex coefficient of the i-th path, derived by transformation of the equation, and
$T_i(t)$ denotes the position of the i-th zero point of the channel transfer function H(s,t).

Thereby, m is determined according to the power delay profile $R_c(\tau)$ of the underlying mobile radio channel.

This means, the amplitude response $|H(j\cdot\omega, t)|$ of the channel in frequency domain can be expressed by using the positions $T_i(t)$ of the zero points:

$$|H(j \cdot \omega, t)| = \sqrt{\text{Re}^2\{H(j \cdot \omega, t)\} + \text{Im}^2\{H(j \cdot \omega, t)\}}$$

$$= |A| \cdot \prod_{i=0}^{m-1} \left| 1 - \frac{j \cdot \omega}{T_i(t)} \right|$$

$$= |A| \cdot \prod_{i=0}^{m-1} \frac{\Delta_i(t)}{T_i(t)}$$

with $\Delta_i(t) := |T_i(t) - j \cdot \omega|$ for $i \in \{0, 1, 2, \ldots, m-1\}$.

This formula expresses the distance between the observation frequency $\omega$ on the $\omega$-axis and the positions $T_i(t)$ of the zero points. Therefore, the amplitude response of the channel in frequency domain can be calculated by multiplying the distances between the observation frequency $\omega$ and the positions $T_i(t)$ of these zero points. Accordingly, the frequency response $$\angle H(j \cdot \omega, t) = \begin{cases} \arctan(\text{Im}\{H\}/\text{Re}\{H\}), & \text{Re}\{H\} > 0 \text{ and } \text{Im}\{H\} > 0 \\ 360° + \arctan(\text{Im}\{H\}/\text{Re}\{H\}), & \text{Re}\{H\} > 0 \text{ and } \text{Im}\{H\} < 0 \\ 180° + \arctan(\text{Im}\{H\}/\text{Re}\{H\}), & \text{Re}\{H\} < 0 \\ 0°, & \text{Re}\{H\} > 0 \text{ and } \text{Im}\{H\} = 0 \\ 90°, & \text{Re}\{H\} = 0 \text{ and } \text{Im}\{H\} > 0 \\ 180°, & \text{Re}\{H\} < 0 \text{ and } \text{Im}\{H\} = 0 \\ 270°, & \text{Re}\{H\} = 0 \text{ and } \text{Im}\{H\} < 0 \end{cases}$$

for $H \equiv H(j \cdot \omega, t)$ and $\angle H(j \cdot \omega, t) \in [0°; 360°[$ (thereby assuming that $|H(j \cdot \omega, t)| \neq 0$)

can be determined with the aid of the zero points $T_i(t)$ of the channel transfer function $H(j \cdot \omega, t)$:

$$\angle H(j \cdot \omega, t) = \sum_{i=0}^{m-1} \varphi_i(t)$$

with $\phi_i(t) := \angle(j \cdot \omega - T_i(t))$ for $i \in \{0, 1, 2, \ldots, m-1\}$.

For example, if these zero points $T_i(t)$ are located near the $\omega$-axis, the frequency-selective distortion becomes severe as notches appear on the amplitude response $|H(j \cdot \omega, t)|$ near the observation frequency $\omega$ as depicted in FIG. 5.

Likewise, the characteristics of the frequency-selective fading will change if the MT 405 (receiver) is moved. Therefore, the receiver must be able to instantaneously estimate the actual channel transfer function $H(j \cdot \omega, t)$.

In the following sections, the mechanism of the channel estimation according to the state of the art shall briefly be described. In FIG. 7, the frame structure of HiperLAN/2 is illustrated. Thereby, three preamble sections 701, 702, and 703 (A, B, and C) are added in front of the data block 704. These preambles 701, 702, and 703 are modulated by a known scrambling sequence SC consisting of 53 scrambling elements $SC_n \in \{-1, 0, +1\}$. For example, the sequence of preamble C in frequency domain is given by $$SC = \{SC_n \mid -26 \leq n \leq +26\}$$

$$:= \{+1, +1, -1, -1, +1, +1, -1, +1, -1, +1, +1, +1, +1,$$

$$+1, +1, -1, -1, +1, +1, -1, +1, -1, +1, +1, +1, +1, 0,$$

$$+1, -1, -1, +1, +1, -1, +1, -1, +1, -1, -1, -1, -1,$$

$$-1, +1, +1, -1, -1, +1, -1, +1, -1, +1, +1, +1, +1\}.$$

The received preamble C in frequency domain can be expressed by the equation $$R_{SC}(j \cdot \omega, t) = H(j \cdot \omega, t) \cdot T_{SC}(j \cdot \omega),$$

wherein $R_{SC}(j \cdot \omega, t)$ denotes the spectrum of the received preamble C, and $T_{SC}(j \cdot \omega)$ is the spectrum of the transmitted preamble C.

The relationship between $T_{SC}(j \cdot \omega)$ and $R_{SC}(j \cdot \omega)$ is given by the following equation:

$$T_{SC}(j \cdot \omega) = A_T \cdot SC_n \cdot \delta(\omega - n \cdot \omega_s - \omega_c),$$

wherein

| | |
|---|---|
| $A_T$ | is the amplitude determined by the gain of the transmitter amplifier and the performance of the antenna, |
| $\delta(\omega)$ | is Dirac's delta function in frequency domain, |
| $f_c$ | represents the carrier frequency, |
| $f_s$ | represents the frequency interval between two different subcarriers, |
| n | is the number of the current scrambling element $sc_n$, |
| $\omega_c = 2\pi \cdot f_c$ | denotes the associated angular frequency of the carrier frequency $f_c$. |
| $\omega_s = 2\pi \cdot f_s$ | denotes the associated angular frequency of the frequency interval $f_s$, and |

Therefore, the estimated channel transfer function $\hat{H}(j \cdot \omega, t)$ can be calculated by means of the following formula:

$$\hat{H}(j \cdot \omega, t) = \frac{R_{sc}(j \cdot \omega, t)}{T_{sc}(j \cdot \omega)}.$$

As can be taken from FIG. 3, the demodulator 315 compensates the received signal $R(j \cdot \omega, t)$ of the data part as depicted in FIG. 7 with frequency-selective fading, thereby using the estimated channel transfer function $\hat{H}(j \cdot \omega, t)$ as follows:

$$X(j \cdot \omega, t) = \frac{R(j \cdot \omega, t)}{\hat{H}(j \cdot \omega, t)} = \frac{H(j \cdot \omega, t)}{\hat{H}(j \cdot \omega, t)} \cdot T(j \cdot \omega),$$

wherein

| | |
|---|---|
| $R(j \cdot \omega, t)$ | denotes the received data part in frequency domain, |
| $T(j \cdot \omega)$ | denotes the transmitted data part in frequency domain, and |
| $X(j \cdot \omega, t)$ | represents the compensation of $R(j \cdot \omega, t)$. |

As an extension of OFDM, conventional AOFDM systems according to the state of the art employ adaptive subcarrier loading techniques. Thereby, the modulation scheme of each subcarrier is determined according to the SNR of each subcarrier, which improves data transfer speed and reduces BER. In this connection, FIG. 6 presents a block diagram 600 for a mobile transmission and reception system supporting wireless communication over a multipath propagation channel 620 by means of a pilot-assisted wireless multi-carrier system (here: an OFDM system) comprising means 618 for a channel estimation, which can be used for an adaptive subcarrier loading.

In the following sections, the adaptive subcarrier loading technique shall be explained by means of diagrams 1001 and 1002 depicted in FIG. 10 and the sequence chart 800 depicted in FIG. 8.

Due to the multipath fading channel, frequency-selective distortion is caused as illustrated in FIG. 10. Around the deep notch of $|H(j \cdot \omega, t)|$, the distortion is severer, and therefore lower-order modulation schemes such as BPSK (M=2) and QPSK (M=4) are more appropriate than higher-order modulation schemes like 16-QAM (M=16) or 64-QAM (M=64), since the distance between neighboring signal points on the constellation planes 201, 202, 203, and 204 decreases with the number M of said signal points, thereby increasing the BER.

When an adaptive subcarrier loading technique is used, lower-order modulation schemes such as BPSK and QPSK are applied to subcarriers around deep notches of $|H(j \cdot \omega, t)|$, and high-order modulation schemes like 16-QAM and 64-QAM are applied to subcarriers around less severe fades as depicted in FIG. 10. Accordingly, the BER can be reduced.

A sequence chart of a conventional subcarrier loading technique showing the data transfer between the access point 401 (AP) and the mobile terminal 405 (MT) according to the state of the art is depicted in FIG. 8. The underlying OFDM system is based on a Time Division Duplex (TDD) system, in which the same frequency is used for the uplink signal and the downlink signal. At first, the MT 405 receives the downlink signal of the AP 401, and estimates the transfer function of the channel. After that, the MT 405 makes the proposal of a modulation scheme according to the channel estimation, and sends the proposal to the AP 401. The AP 401 receives the proposal and evaluates it. If it is acceptable, the AP 401 sends an acknowledgment message for the proposal, sets up the modulation scheme for the downlink signal according to said proposal, and sends the downlink signal. The MT 405 receives the acknowledgment message for the proposal, sets up the modulation scheme according to the proposal, and receives the downlink signal.

In the U.S. Pat. No. 6,175,550, a scaleable OFDM system and a method for providing OFDM signals are disclosed that support increased flexibility and adaptability in various communication environments by providing a dynamic scaling of specific operating parameters and/or characteristics of the OFDM system, including symbol duration, guard time interval, number of the OFDM carriers, and number of bits per symbol and OFDM carrier. For example, by dynamically scaling the bit rate, widely varying signal bandwidths, delay spread tolerances and signal-to-noise ratio (SNR) requirements can be achieved. As such, a scaleable OFDM system is particularly suitable for applications in wireless communication devices which support a plurality of services in a variety of environments (both indoor and outdoor) and in radio channels with differing bandwidths.

In the article "Performance of the BRAIN Air Interface: Simulation Results and Proposed System Optimization for the Standardization Process" (BRAIN Deliverable 3.2 Document IST-1999-10050/BRAIN, 2001), an adaptive subcarrier modulation for an enhanced HiperLAN/2 link level performance is disclosed. Thereby, adapting the transmission scheme in HiperLAN/2 systems is possible by choosing an appropriate combination of modulation level and code rate in the link adaptation process. In the OFDM transmission technique, however, there is even the flexibility to individually adapt the modulation scheme for each OFDM subcarrier depending on the specific signal-to-noise ratio (SNR) on a sub-channel. This principle is usually referred to as "adaptive modulation". The actual bit (and power) allocation is performed by so-called loading algorithms, which mainly differ in their optimization criteria and computational load. It is well-known that this technique can drastically reduce the bit error rate in the uncoded case and is thus an interesting technique to meet the requirement of increasing the spectral efficiency. Adaptive (subcarrier-specific) modulation has already been incorporated into standards for OFDM-based wired transmission (e.g. Asymmetric Digital Subscriber Line, ADSL). This technology is effective in static- or slow-mobility environments to increase the throughput at a given SNR or to decrease the required SNR (and therefore to increase the range and capacity for a given throughput).

In case conventional adaptive subcarrier loading techniques according to the state of the art are applied, which do not comprise any prediction function, an incorrect assignment of the modulation schemes for said subcarriers could possibly occur since the channel transfer function $H(j \cdot \omega, t)$ is extremely time-variant and might change between the time when the channel distortion is measured and the time when the signal according to a new modulation scheme assignment is transmitted. On the other hand, the negotiation of the modulation scheme between an MT 405 and an AP 401 always needs some time.

SUMMARY OF THE INVENTION

In view of the explanations mentioned above, it is the object of the invention to propose a new adaptation technique for a pilot-assisted wireless multi-carrier system which allows to reduce the probability of an incorrect assignment of different modulation schemes to the applied subcarriers caused by MTs moving at high velocity.

This object is achieved by means of the features of the independent claims. Advantageous features are defined in the dependent claims.

The underlying invention is basically dedicated to the idea of supporting wireless communication systems based on OFDM by providing an adaptive subcarrier loading function which can advantageously be applied to predict the transfer function $H(j \cdot \omega, t)$ of a multipath propagation channel being severely impaired by attenuation fades (frequency-selective fading) and a time-variant behavior by estimating the position and movement of zero points of the channel transfer function $H(s, t)$ on an s-plane, where s represents the complex observation frequency ($s := \sigma + j \cdot \omega$), in order to assign the modulation scheme of each subcarrier according to the estimated channel transfer function $\hat{H}(j \cdot \omega, t)$, determined by an evaluation of the distortion caused by frequency-selective fading.

BRIEF DESCRIPTION OF THE DRAWINGS

Further advantages and possible applications of the underlying invention result from the subordinate claims as well as from the following description of two preferred embodiments of the invention which are depicted in the following drawings.

DETAILED DESCRIPTION OF THE INVENTION

In the following, the functions of the structures in an embodiment of the underlying invention as depicted in FIGS. 9 to 13 are explained in detail. The meaning of the employed symbols designated with reference signs in FIGS. 1 to 13 can be taken from the appended table of reference signs.

The invention provides an adaptive subcarrier loading function for a mobile receiver 1310 in a wireless communication system 1300 based on OFDM that can advantageously be applied to predict the channel transfer function H(j·ω,t) of a multipath propagation channel 1320 being severely impaired by frequency-selective fading and an extremely time-variant behavior by detecting the position and/or movement of zero points (A, B, C) of said transfer function H(j·ω, t). The position of said zero points (A, B, C) changes continuously if there is no shadowing phenomenon. By observing the position and movement of said zero points (A, B, C), the frequency response H(j·ω,t) of the multipath propagation channel 1320 can be expected. Thereby, the probability of an incorrect assignment of different modulation schemes for the applied subcarriers 102, that is caused by mobile terminals 405 (MTs) moving at high velocity, can significantly be reduced.

Figure 9:
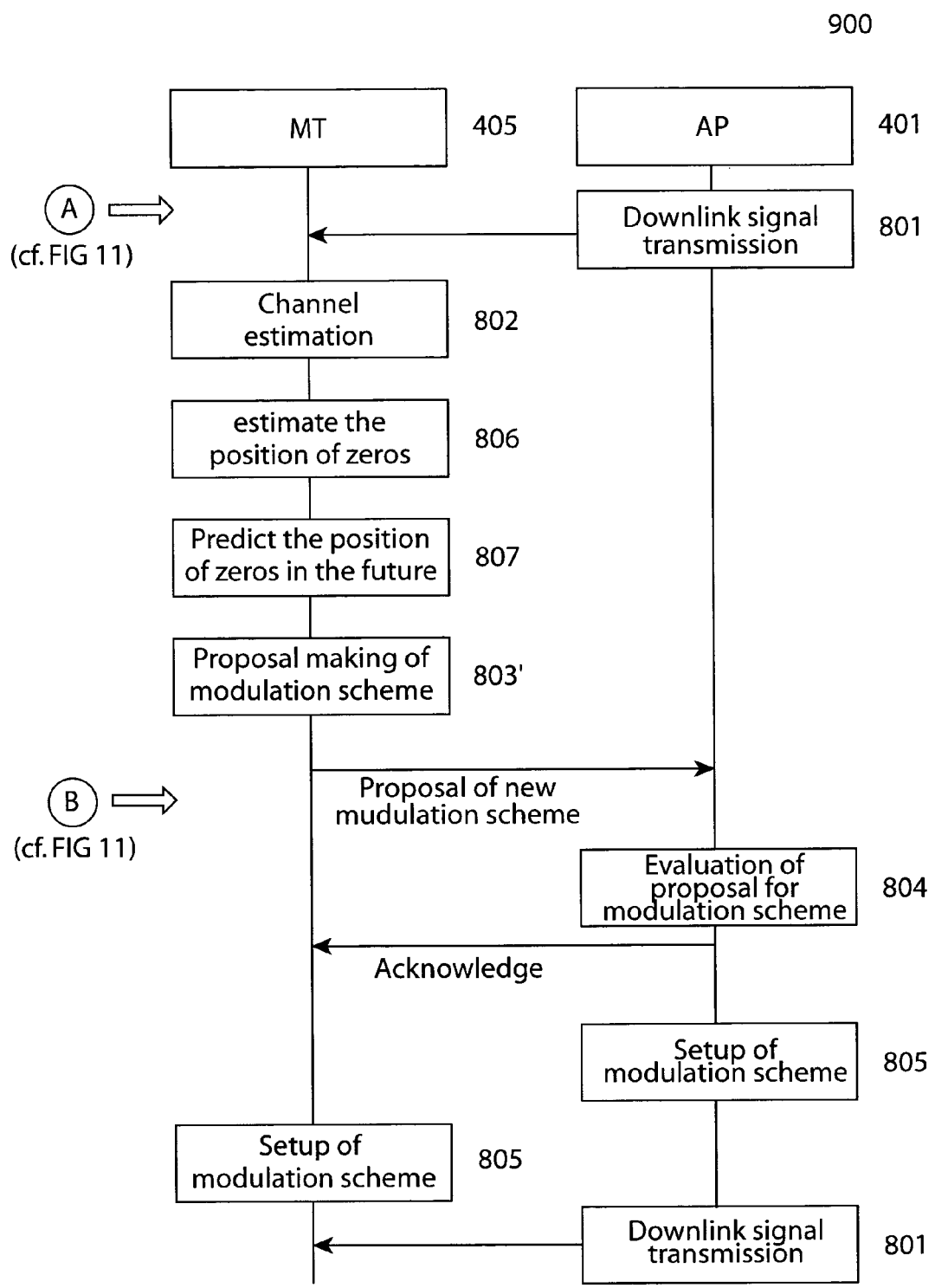
Figure 10:
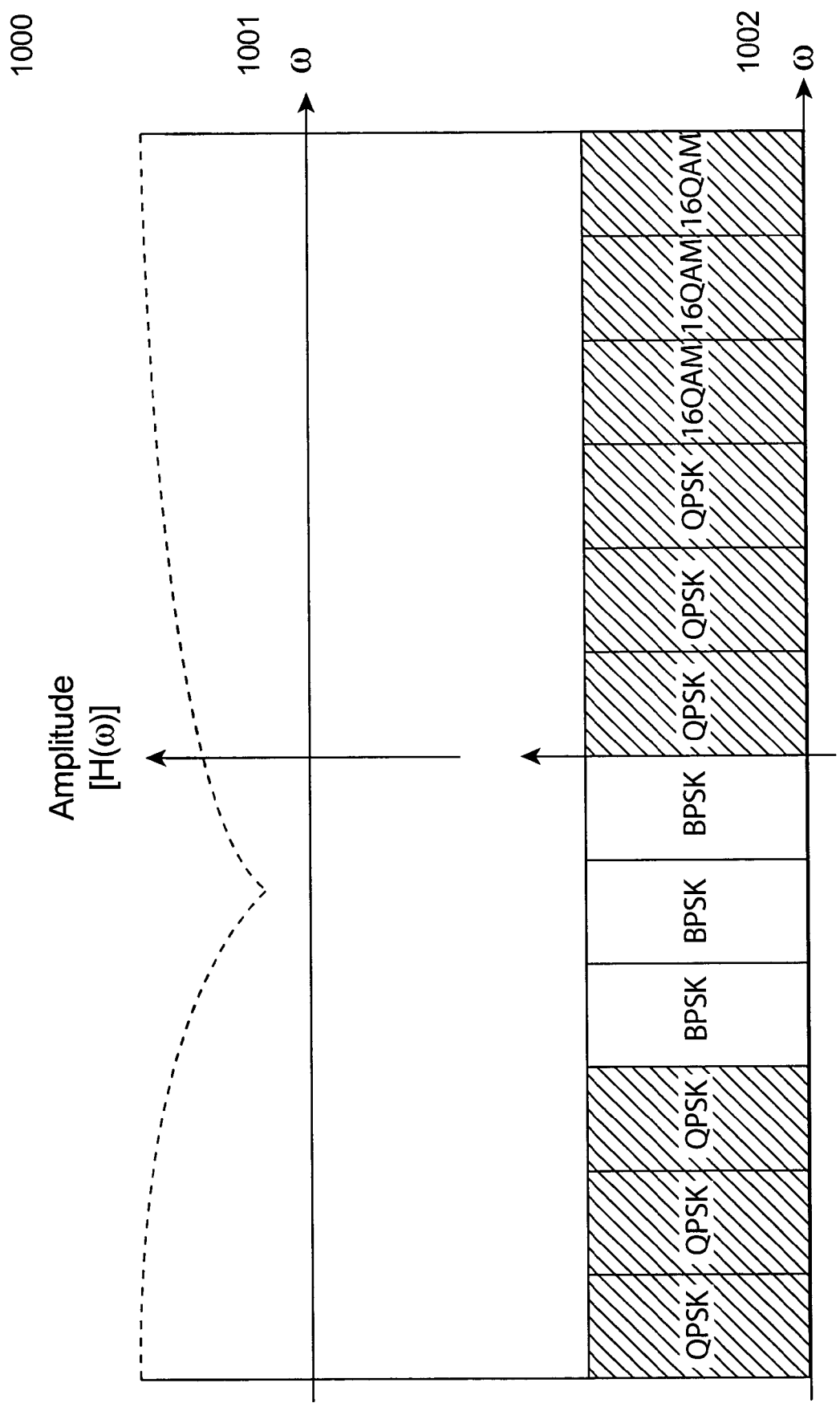
FIG. 10 presents two diagrams giving an overview of the adaptive subcarrier loading according to the underlying invention.

A sequence chart 900 for the adaptive subcarrier loading according to the underlying invention is depicted in FIG. 9. In the depicted case, the employed OFDM system is a Time Division Duplex (TDD) system, wherein the same frequency is used for uplink and downlink. At first, the MT 405 receives the downlink signal of the AP 401 and estimates the transfer function H(j·ω,t) of the multipath propagation channel 1320. Then, the MT 405 estimates the position of zero points (A, B) and predicts the position of zero points (C) for succeeding downlink signal bursts 700. After that, the MT 405 makes a proposal for a modulation scheme according to said prediction, and sends this proposal to the AP 401. The AP 401 receives the proposal and evaluates it, and—if it is acceptable—sends an acknowledgment message for the proposal, sets up the modulation scheme of the downlink signal according to the proposal, and sends the downlink signal. The MT 405 receives the acknowledgment message for the proposal, sets up the modulation scheme according to the proposal, and receives the downlink signal (emphasis added).

Figure 7:
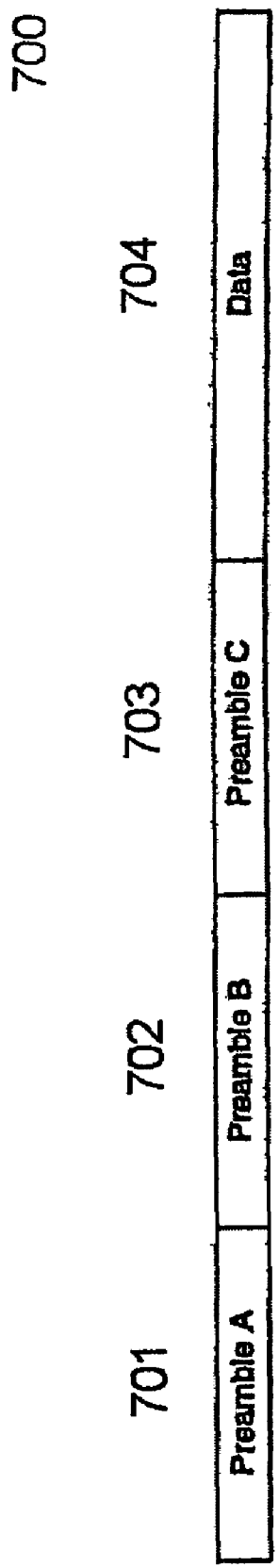
FIG. 7 shows an example of a downlink signal burst with three preambles (A, B, and C), FIG. 8 exhibits a sequence chart showing the data transfer between the access point (AP) and the mobile terminal (MT) according to the state of the art, FIG. 9 exhibits a sequence chart showing the data transfer between the access point 401 (AP) and the mobile terminal 405 (MT) according to the underlying invention.
Figure 8:
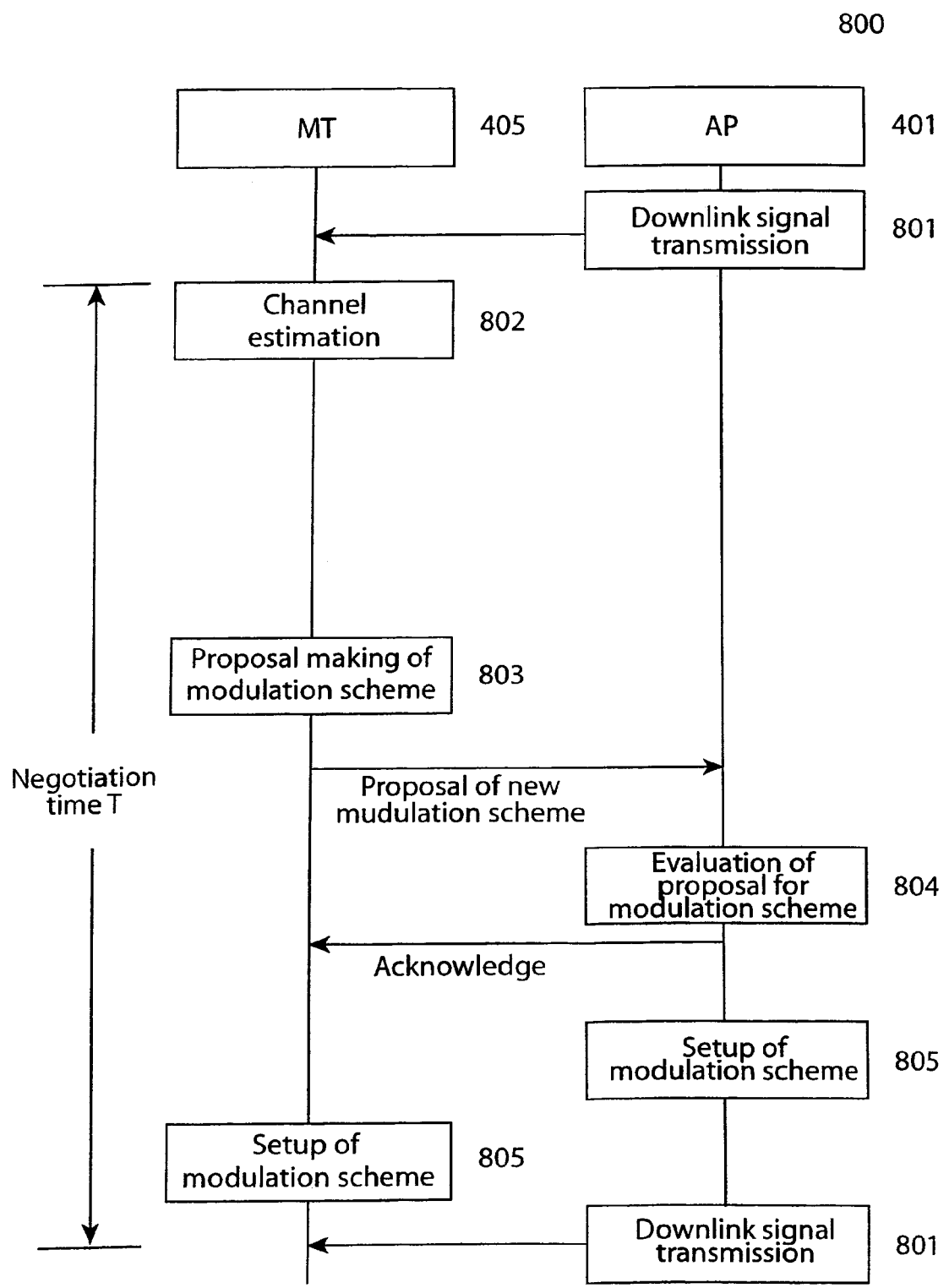
Figure 11:
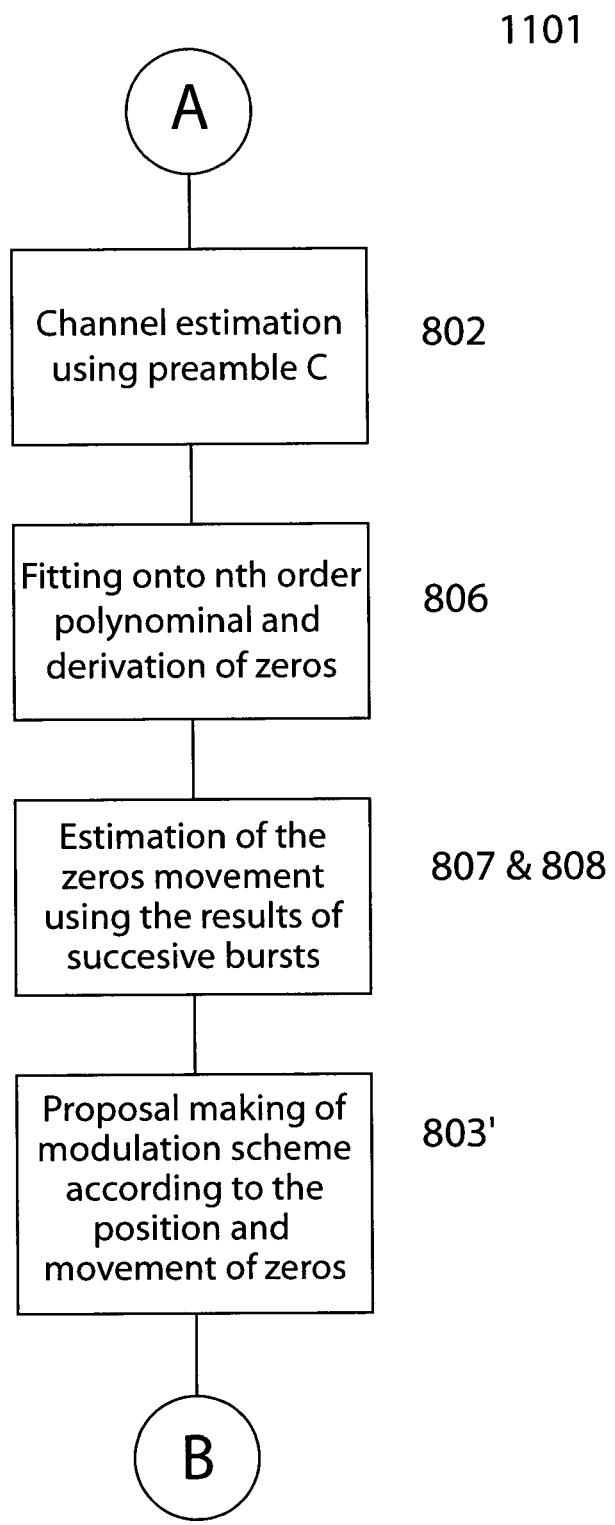
FIG. 11 shows a flowchart of a modulation scheme planning.

A detailed explanation of the function to estimate and predict the position and movement of zero points (A, B, C) is depicted in FIG. 11. At first, the receiver 1310 estimates the channel response for the preamble 703. In FIG. 7, the frame structure of HiperLAN/2 is illustrated. Thereby, said preamble 703 is modulated by a known scrambling sequence. Reference symbols transmitted by means of said pilot patterns are scrambled by means of a pseudo-noise scrambling sequence generated by a generator polynomial, which is known to the mobile transmitter 1301 and the mobile receiver 1310, in order to randomize the reference symbols to be transmitted.

In the following, the channel transfer function H(s,t) shall be approximated by a polynomial G(s,t) of M-th order (wherein M<m):

$$G(s, t) = \sum_{i=0}^{M-1} b_i(t) \cdot s^i = A \cdot \prod_{i=0}^{M-1} \left(1 - \frac{s}{T_i(t)}\right),$$

wherein
- A is a complex amplitude factor, derived by transformation of the equation,
- $b_i(t)$ denotes the complex coefficient of the i-th path, derived by reformation of the equation, and
- $T_i(t)$ denotes the position of the i-th zero point point of the channel transfer function G(s,t).

Therefore, to obtain an approximation $\hat{H}(j·ω,t)$ of the channel transfer function H(j·ω,t), the values of A and $T_i(t)$ are determined to minimize the energy γ(t) of the difference $$\hat{H}(j·ω,t) - G(j·ω,t),$$

which is defined as follows:

$$\gamma(t) := \int_{-\infty}^{+\infty} |\hat{H}(j·ω, t) - G(j·ω, t)|^2 d\omega \stackrel{!}{=} \text{Min.} \Leftrightarrow \frac{d}{dt}\gamma(t) \stackrel{!}{=} 0 \wedge \frac{d^2}{dt^2}\gamma(t) \stackrel{!}{>} 0.$$

Figure 12:
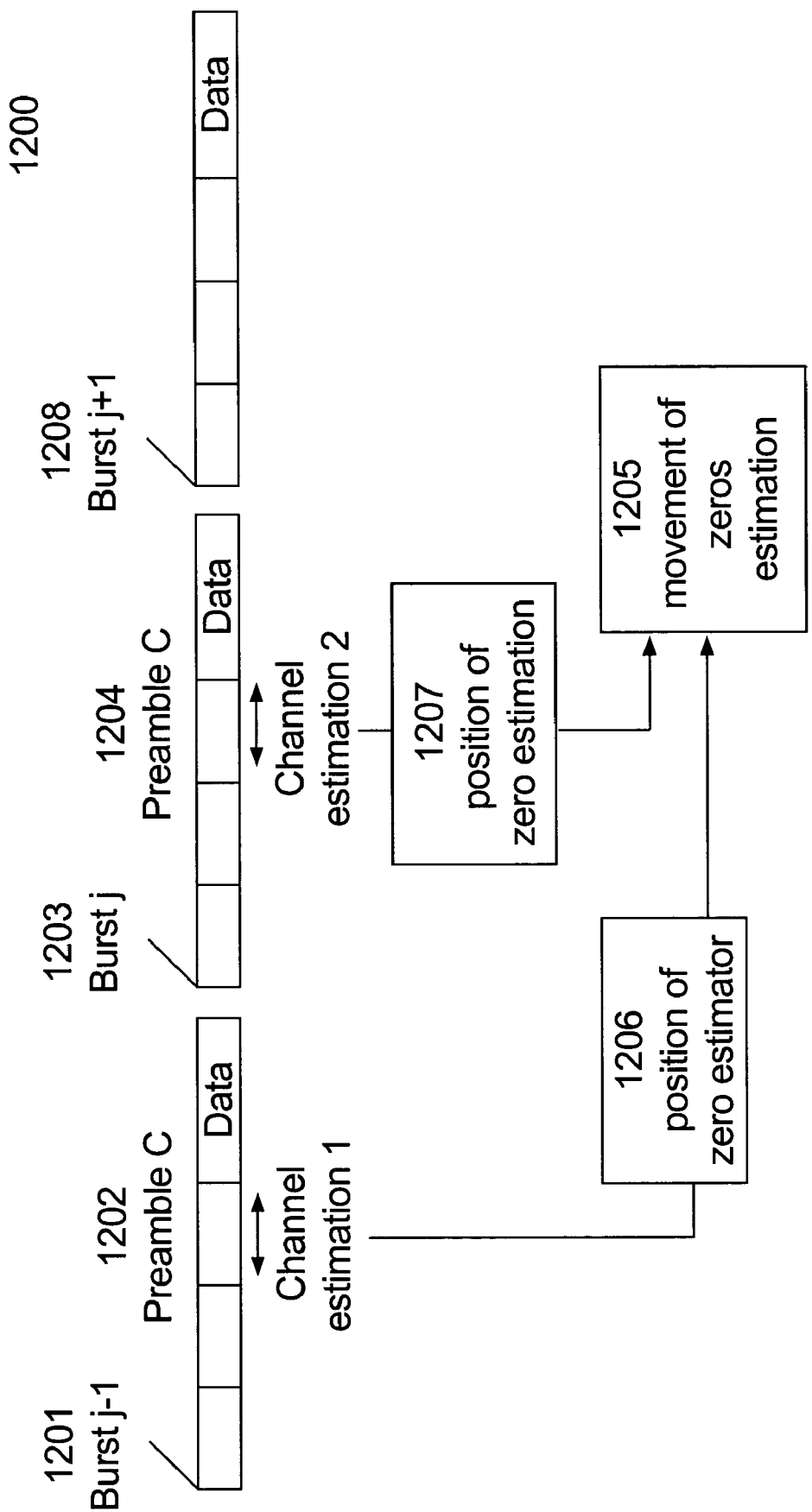
FIG. 12 shows a timing chart according to the underlying invention which is applied to calculate the movement of zero points of the extremely time-variant channel transfer function H(j·ω,t)

Accordingly, the positions of the zero points $T_i(t)$ are derived, and the movement of the zero points can be calculated as depicted in FIG. 12. Thereby, the zero point $T_{i,j-1}$ of burst j−1 is calculated by the position of the zero point estimator 1206, and the zero point $T_{i,j}$ of the succeeding burst j is calculated by the position of the zero point estimator 1207. The movement ΔT of said zero points can be obtained from the difference $$\Delta T := T_{i,j} - T_{i,j-1}.$$

Therefore, the predicted zero point position at burst j+1 can be calculated as $$T_{i,j+1} = T_{i,j} + \Delta T.$$

Figure 1:
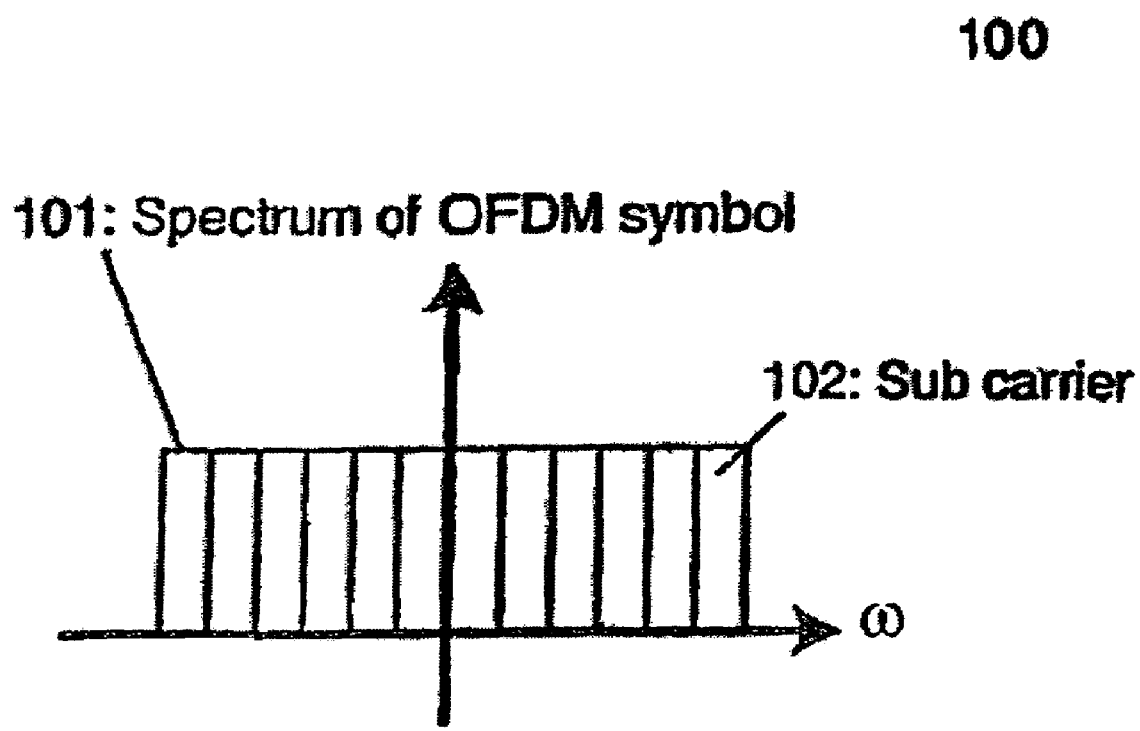
FIG. 1 presents a diagram showing the spectrum of an OFDM symbol and the modulation schemes for its subcarriers, FIG. 2 exhibits four diagrams showing the modulation schemes that can be applied to each subcarrier.
Figure 2:
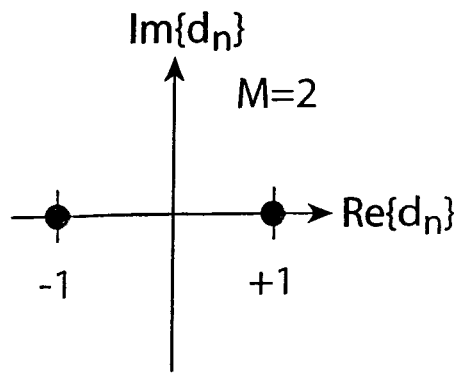
Figure 2:
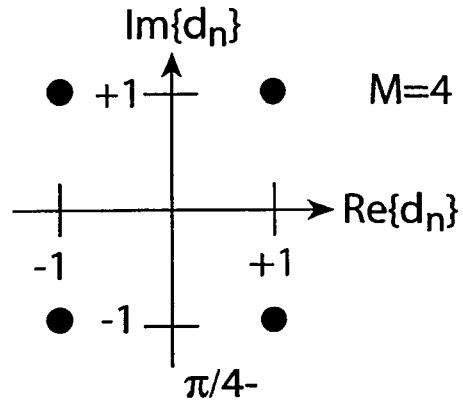
Figure 2:
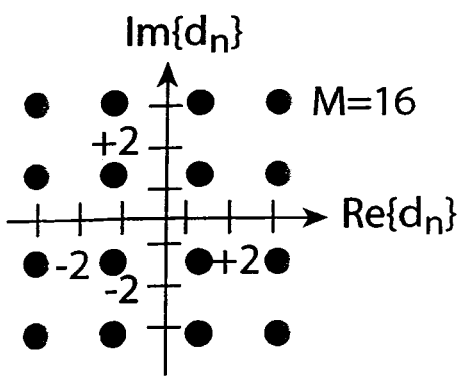
Figure 2:
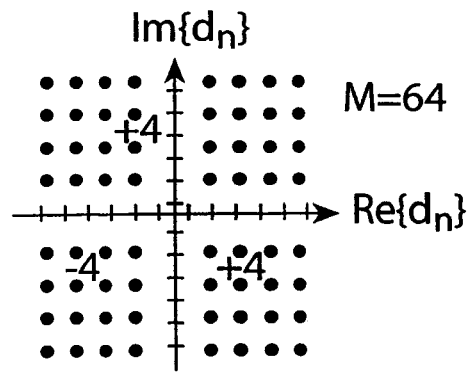
Figure 3:
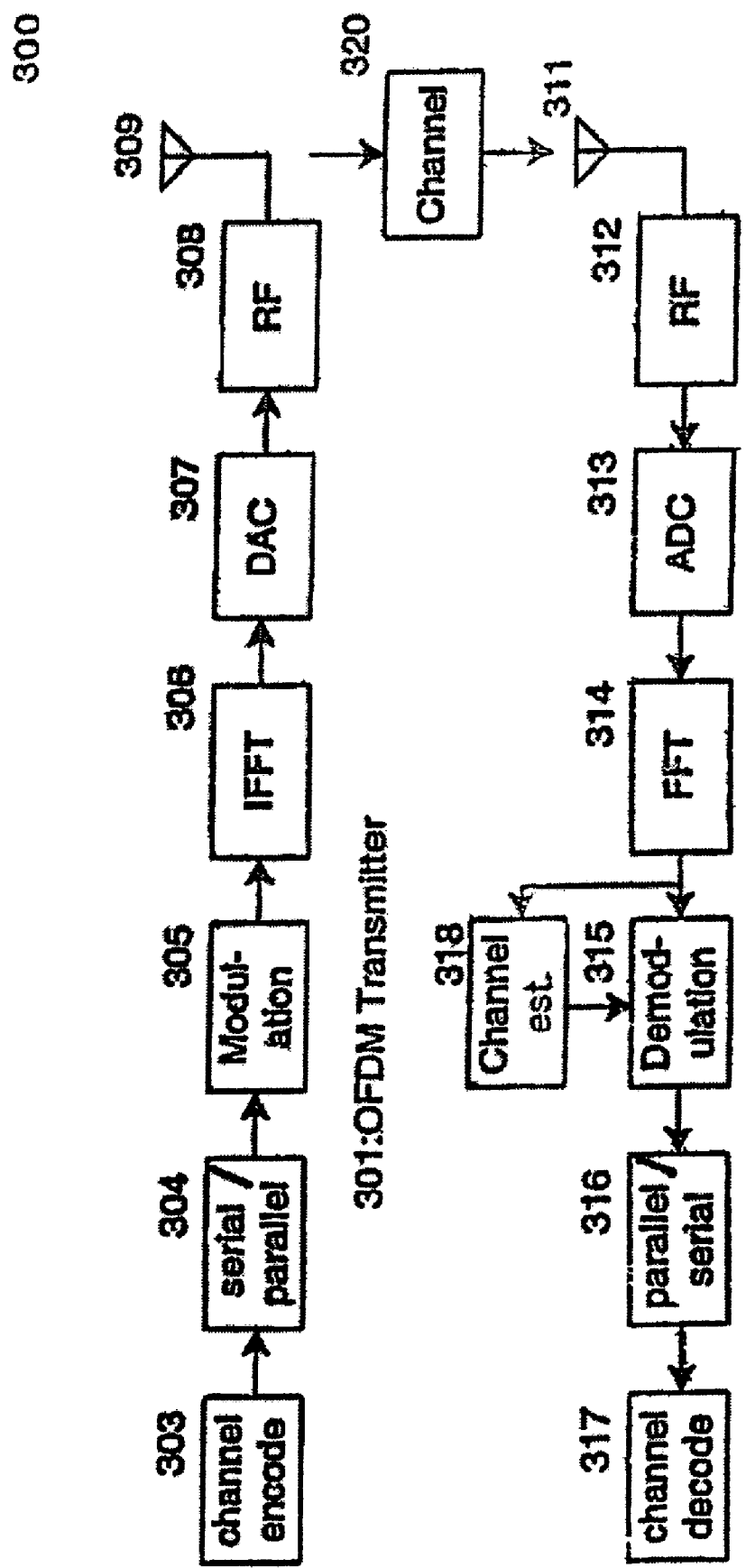
FIG. 3 shows a block diagram for a mobile transmission and reception system supporting wireless communication over a multipath propagation channel with the aid of a pilot-assisted wireless multi-carrier system (here: an OFDM system) comprising means for a channel estimation according to the state of the art.
Figure 4:
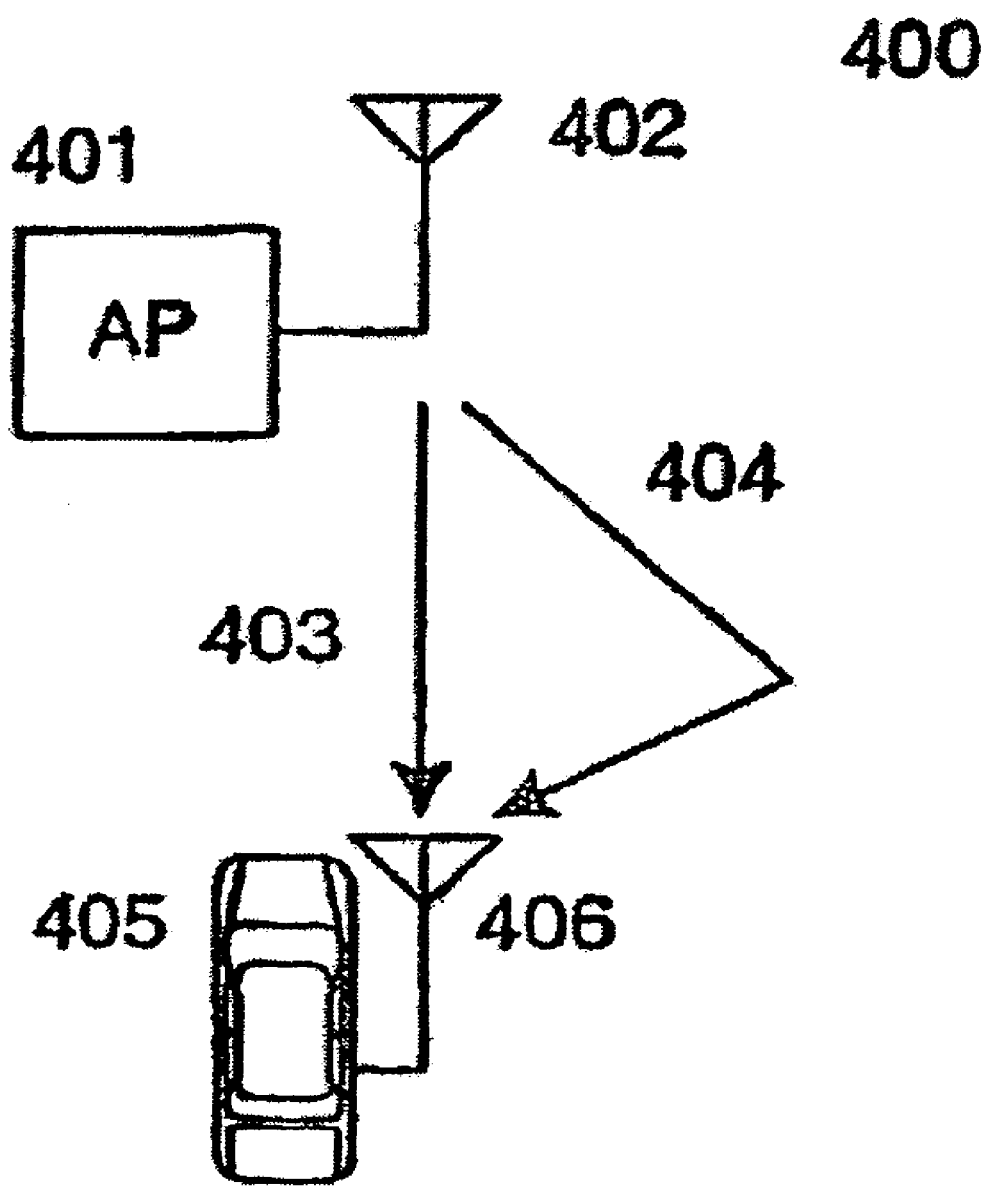
FIG. 4 presents a diagram showing a typical example for a propagation model with one access point (AP) and one moving mobile terminal (MT)
Figure 5:
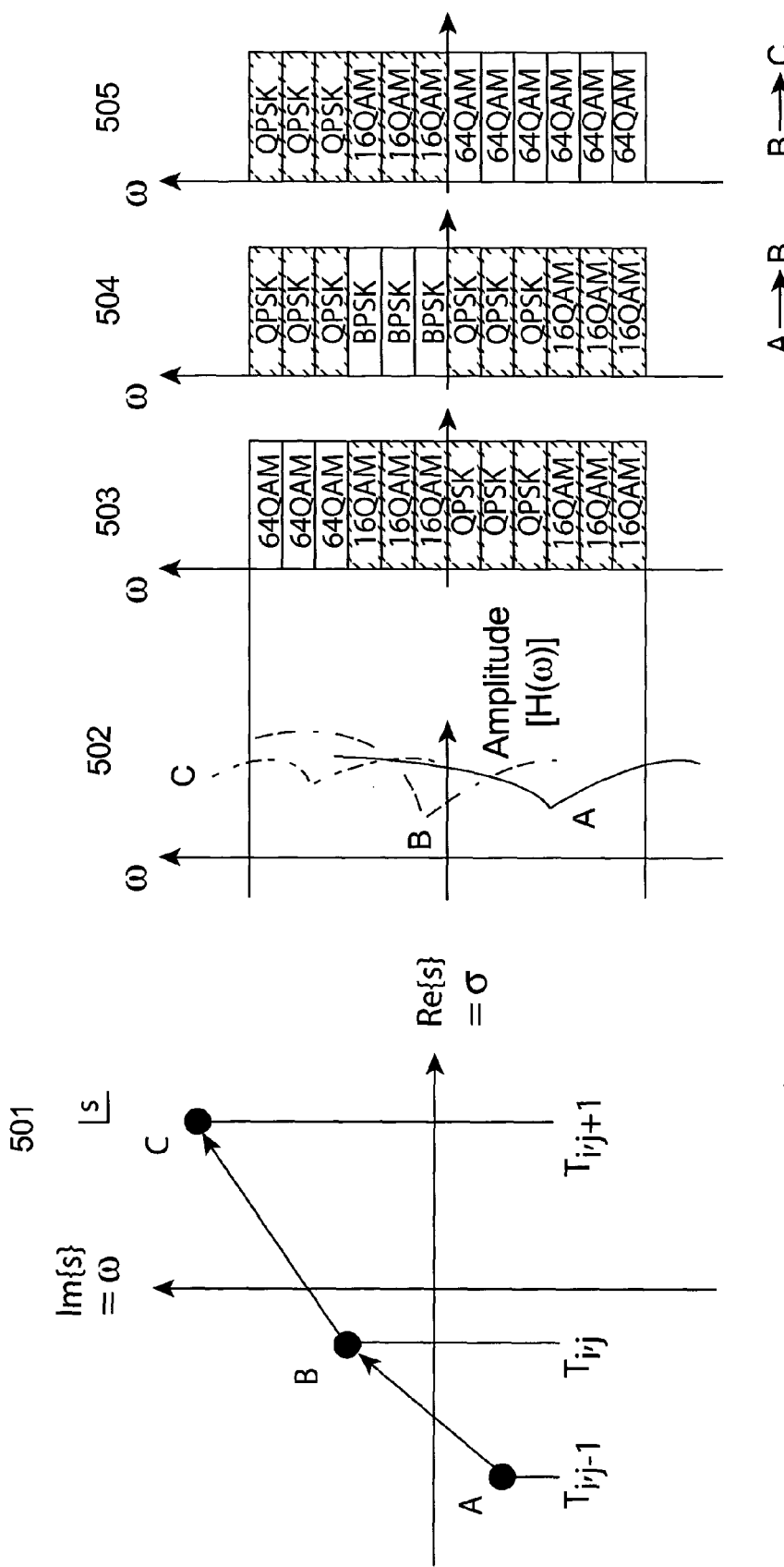
FIG. 5 presents five diagrams giving an overview of channel distortion caused by a severe frequency-selective fading and the time-variant behavior of the underlying multipath propagation channel.
Figure 6:
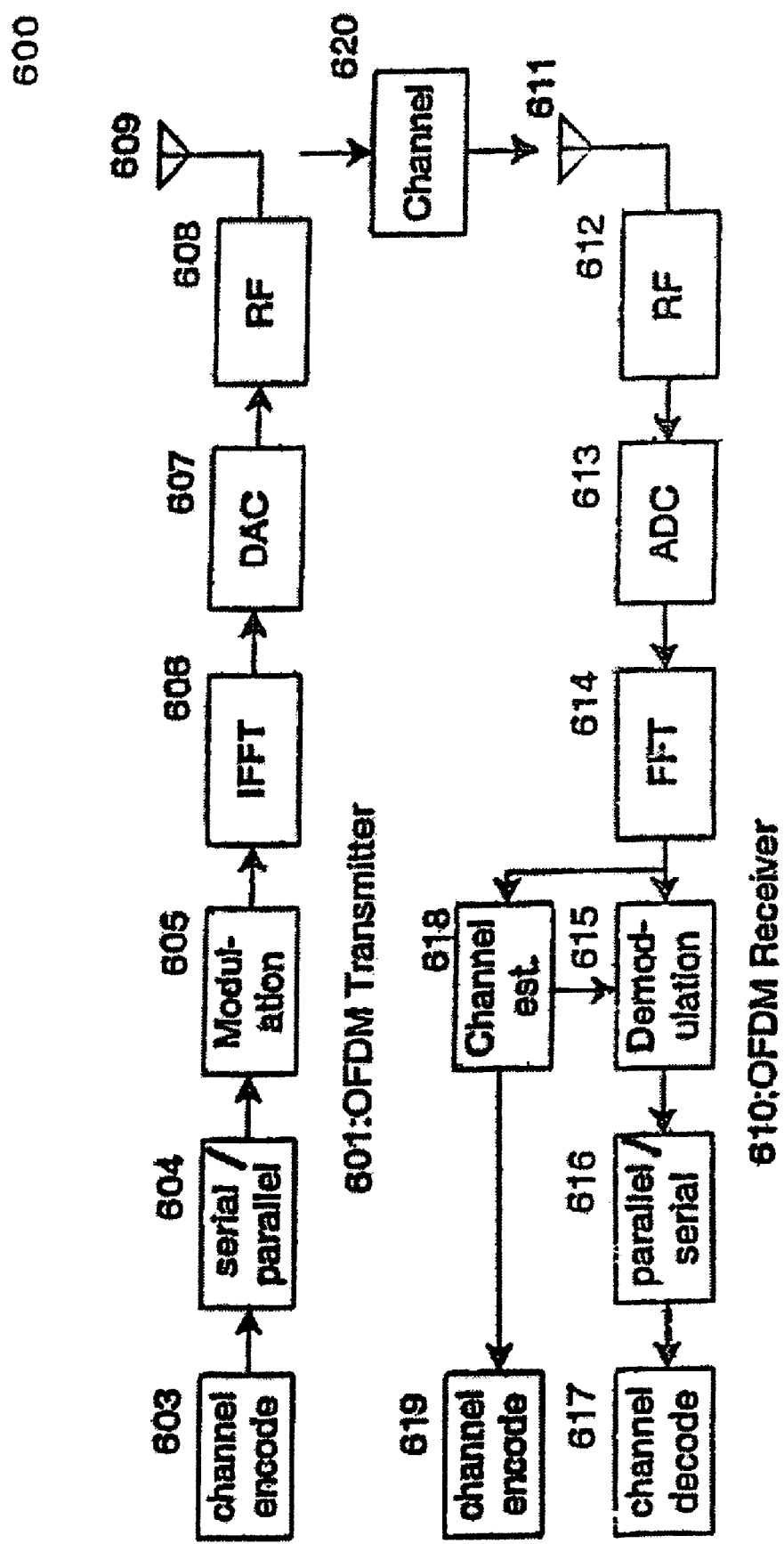
FIG. 6 presents a block diagram for a mobile transmission and reception system supporting wireless communication over a multipath propagation channel by means of a pilot-assisted wireless multi-carrier system (here: an OFDM system) comprising means for a channel estimation, which can be used for an adaptive subcarrier loading.

To make a proposal for a new modulation scheme, the position and movement of zero points (A, B, and C) is considered. In FIG. 5, the position and movement of said zero points on an s-plane is illustrated. If a zero point is located at A as depicted in diagram 501, the amplitude of the transfer function H(j·ω,t) has a notch at A. If zero points are located at B and C as depicted in diagram 502, the function H(j·ω,t) has a notch at B and C, respectively. The position of the zero point at B is located nearby the ω-axis; therefore, the notch at B is deeper. In this case, the frequency-selective fading becomes severer.

If the current position of a zero point is A and the prediction of said zero point is B, a higher modulation scheme can not be assigned around the frequency of B, even if currently there is no notch around the frequency of B. If the current position of the zero point is B and the position of the prediction for said zero point is C, a higher modulation scheme can be assigned around the frequency of B, even if currently there is a deep notch around the frequency of B.

Figure 13:
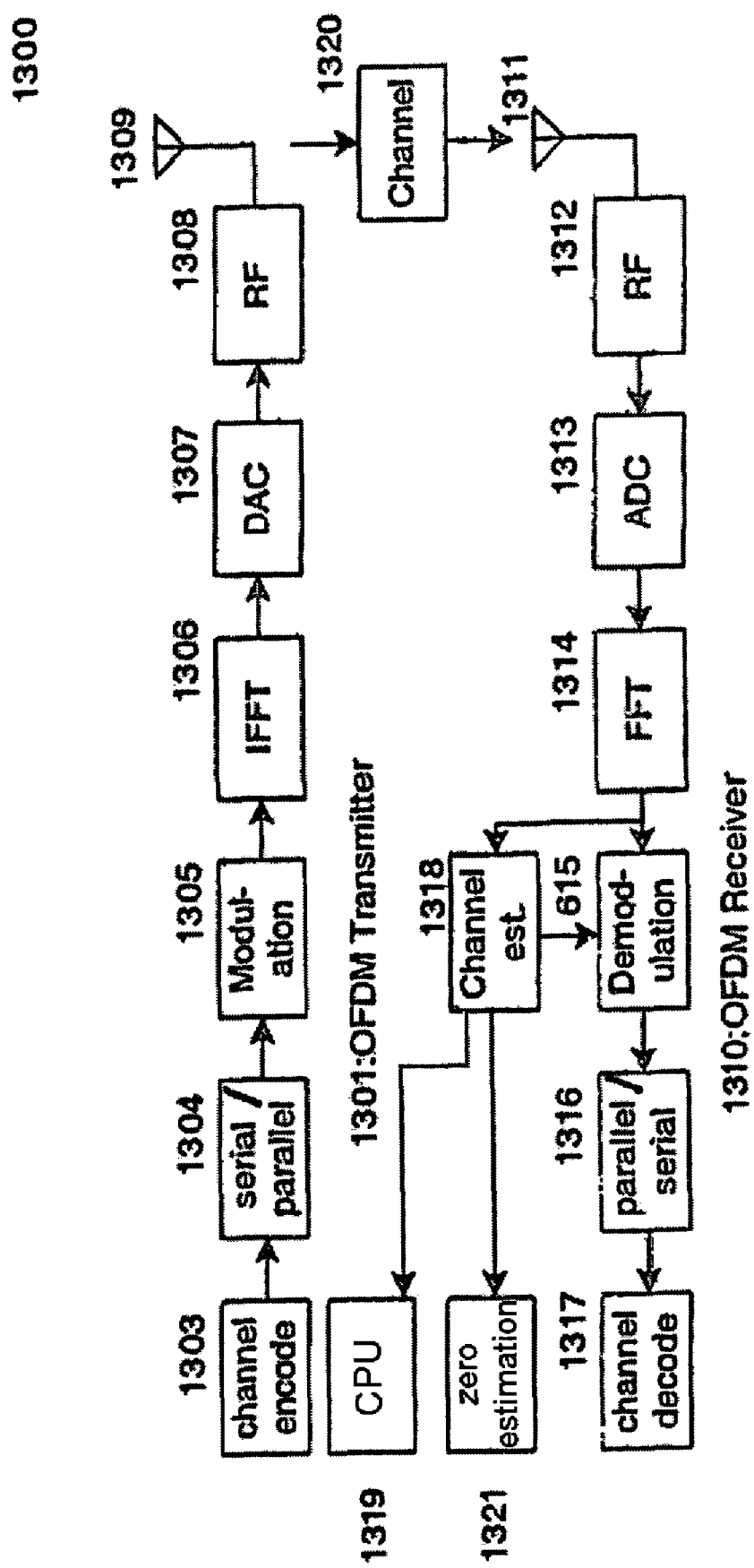
FIG. 13 presents a block diagram for a mobile transmission and reception system supporting wireless communication over a multipath propagation channel by means of a pilot-assisted wireless multi-carrier system (here: an OFDM system) comprising means for a channel estimation according to the underlying invention, which can be used for an adaptive subcarrier loading.

A block diagram 1300 for a mobile transmission and reception system supporting wireless communication over a multipath propagation channel 1320 by means of a pilot-assisted wireless multi-carrier system (here: an OFDM system) according to the underlying invention, which comprises means for a channel estimation 318 and an adaptive subcarrier loading is given by FIG. 13. Thereby, the user data is fed to a channel encoder 1303. Then, by using a serial-to-parallel converter 1304, the output data of said channel encoder is converted from serial to parallel according to the number of bits per subcarrier in one OFDM symbol. After that, the output data of said serial-to-parallel converter 1304 is modulated by means of a modulator 1305 and converted from frequency domain to time domain by using an Inverse Fast Fourier Transform 1306 (IFFT), and then submitted to a digital-to-analog conversion performed by a digital-to-analog converter 1307 (DAC). The output of said DAC 1307 is then up-converted to the passband by means of an RF block 1308, and is finally supplied to a transmitting antenna 1309 and radiated to the air.

The radiated RF signal propagates through several paths, which are modeled as a multipath fading channel 1320, which causes frequency-selective distortion.

At an OFDM receiver 1310, the signal from said multipath fading channel 1320 is amplified and down-converted to the base-band by another RF block 1312, and supplied to an analog-to-digital converter 1313 (ADC). The output of said ADC 1313 is then transformed from time domain to frequency domain by a Fast Fourier Transform 1314 (FFT). Finally, by using the output of the FFT 1314, a channel estimator 1318 estimates the channel transfer function $\hat{H}(j\cdot\omega, t)$ of said channel 1320.

At a demodulator 1315, the output of said FFT 1314, which includes frequency-selective distortion caused by said channel 1320, is then compensated with the aid of the estimated channel transfer function $\hat{H}(j\cdot\omega,t)$, and supplied to a parallel-to-serial converter 1316. The output of said parallel-to-serial converter 1316 is finally fed to the channel decoder 1317, and the user data is derived.

Using the output of the channel estimator 1318, the so-called zero estimator 1321 estimates the position and movement of zero points (A, B, C), and supplies them to the central processing unit 1319 (CPU), which makes the modulation assignment plan for each subcarrier.

The main advantageous differences between the underlying invention and the state of the art consist in the prediction of the channel transfer function $\hat{H}(j\cdot\omega,t)$, which is determined on the basis of frequency-selective fading. Thereby, based on the principle of the propagation model, the channel distortion caused by frequency-selective fading is predicted. When the proposed approach according to the underlying invention is employed, the BER of OFDM systems using an adaptive subcarrier loading technique can significantly be reduced. Furthermore, the probability of an incorrect assignment of the applied modulation scheme for the subcarriers can be reduced by using said prediction method.

Table: Depicted Features and Their Corresponding Reference Signs

| No. | Feature |
|---|---|
| 100 | diagram showing the spectrum of an OFDM symbol 101 and the modulation schemes for its subcarriers 102 |
| 101 | OFDM symbol consisting of 52 subcarriers |
| 102 | subcarriers of said OFDM symbol 101 |
| 200 | four diagrams 201, 202, 203, and 204 showing the modulation schemes that can be applied to each subcarrier |
| 201 | 1$^{st}$ modulation scheme: Binary Phase Shift Keying (BPSK) |
| 202 | 2$^{nd}$ modulation scheme: Quaternary Phase Shift Keying with a phase shift of $\phi_k = k \cdot \pi/4$ for $k \in \{1, 3, 5, 7\}$ (π/4-QPSK) |
| 203 | 3$^{rd}$ modulation scheme: Quadrature Amplitude Modulation for a 16-point signal constellation (16-QAM) |
| 204 | 4$^{th}$ modulation scheme: Quadrature Amplitude Modulation for a 64-point signal constellation (64-QAM) |
| 300 | block diagram for a mobile transmission and reception system supporting wireless communication over a multipath propagation channel 320 by means of a pilot-assisted wireless multi-carrier system (here: an OFDM system) comprising means for a channel estimation 318 according to the state of the art |
| 301 | OFDM transmitter |
| 303 | channel encoder |
| 304 | serial-to-parallel (S/P) converter |
| 305 | OFDM modulator |
| 306 | digital signal processor performing an Inverse Fast Fourier Transform (IFFT) |
| 307 | digital-to-analog (D/A) converter |
| 308 | RF block performing a signal up-conversion from the baseband to the passband |
| 309 | transmitting (TX) antenna |
| 310 | OFDM receiver |
| 311 | receiving (RX) antenna |
| 312 | RF block performing a signal down-conversion from the passband to the baseband |
| 313 | analog-to-digital (A/D) converter |
| 314 | digital signal processor performing a Fast Fourier Transform (FFT) |
| 315 | OFDM demodulator |
| 316 | parallel-to-serial (P/S) converter |
| 317 | channel decoder |
| 318 | channel estimator |
| 320 | multipath propagation channel, characterized by a severe frequency-selective fading and a time-variant behavior |
| 400 | diagram showing a typical example for a propagation model |
| 401 | access point (AP) |
| 402 | RX/TX antenna of said access point 401 |
| 403 | 1$^{st}$ path of the radiated RF signal from the transmitter to the receiver, characterized by reflection at buildings and other objects |

-continued

| No. | Feature |
|---|---|
| 404 | 2nd path of the radiated RF signal from the transmitter to the receiver, characterized by reflection at buildings and other objects |
| 405 | mobile terminal (MT) in a moving receiver (e.g. a car which drives at high speed) |
| 406 | receiving (RX) antenna of said mobile terminal (MT) |
| 500 | five diagrams giving an overview of channel distortion caused by a severe frequency-selective fading and the time-variant behavior of the underlying multipath propagation channel 320 |
| 501 | diagram showing the movement of zero points (A, B, and C) of the channel transfer function H(s, t) on an s-plane, where s is the complex observation frequency (s = σ + j · ω) |
| 502 | diagram showing the amplitude response |H(j · ω, t)| of the channel transfer function H(j · ω, t) according to the current position of its notches (A, B, and C) |
| 503 | diagram showing a conventional spectrum of an OFDM signal, in which each subcarrier is modulated by a fixed modulation scheme (202, 203, or 204) |
| 504 | diagram showing a first spectrum of a transmitted OFDM signal between the positions of the zero points A and B according to the underlying invention |
| 505 | diagram showing a second spectrum of a transmitted OFDM signal between the positions of the zero points B and C according to the underlying invention |
| 600 | block diagram for a mobile transmission and reception system supporting wireless communication over a multipath propagation channel 620 by means of a pilot-assisted wireless multi-carrier system (here: an OFDM system) comprising means for a channel estimation 618, which can be used for an adaptive subcarrier loading |
| 601 | OFDM transmitter |
| 603 | channel encoder |
| 604 | serial-to-parallel (S/P) converter |
| 605 | OFDM modulator |
| 606 | digital signal processor performing an Inverse Fast Fourier Transform (IFFT) |
| 607 | digital-to-analog (D/A) converter |
| 608 | radio frequency (RF) block |
| 609 | transmitting (TX) antenna |
| 610 | OFDM receiver |
| 611 | receiving (RX) antenna |
| 612 | radio frequency (RF) block |
| 613 | analog-to-digital (A/D) converter |
| 614 | digital signal processor performing a Fast Fourier Transform (FFT) |
| 615 | OFDM demodulator |
| 616 | parallel-to-serial (P/S) converter |
| 617 | channel decoder |
| 618 | channel estimator |
| 619 | central processing unit (CPU) |
| 620 | multipath propagation channel, characterized by a severe frequency-selective fading and a time-variant behavior |
| 700 | example of a downlink signal burst with three preambles (A, B, and C) according to the HiperLAN/2 standard |
| 701 | 1st preamble frame (A) of the downlink signal burst 700 |
| 702 | 2nd preamble frame (B) of the downlink signal burst 700 |
| 703 | 3rd preamble frame (C) of the downlink signal burst 700 |
| 704 | data frame of the downlink signal burst 700 |
| 800 | sequence chart showing the data transfer between the access point 401 (AP) and the mobile terminal 405 (MT) according to the state of the art |
| 801 | downlink signal transmission |
| 802 | channel estimation |
| 803 | proposal for the execution of a modulation scheme according to the state of the art |
| 803' | proposal for the execution of a modulation scheme using the position and movement of zero points of the channel transfer function H(j · ω, t) according to the underlying invention |
| 804 | evaluation of the proposal 803 for the execution of a modulation scheme |
| 805 | set-up of a modulation scheme |
| 806 | estimation of the position of zero points of the channel transfer function H(j · ω, t) |
| 807 | prediction of the position of said zero points for the preamble C of next downlink signal burst j |
| 808 | estimation of the movement of zero points of the channel transfer function H(j · ω, t) using the results of the current downlink signal burst j − 1 and the next downlink signal burst j |
| 900 | sequence chart showing the data transfer between the access point 401 (AP) and the mobile terminal 405 (MT) according to the underlying invention |
| 1000 | two diagrams giving an overview of the adaptive subcarrier loading according to the underlying invention |
| 1001 | diagram showing the amplitude response |H(j · ω, t)| of the channel transfer function H(j · ω, t) |
| 1002 | diagram showing the spectrum of a transmitted OFDM signal and the modulation schemes of its subcarriers 102 |
| 1100 | flowchart of a modulation scheme planning |
| 1200 | timing chart according to the underlying invention which is applied to calculate the movement of zero points of the channel transfer function H(j · ω, t) |
| 1201 | downlink signal burst j − 1 with the preambles A, B, and C |
| 1202 | preamble C of the (j − 1)-th downlink signal burst 1201 |
| 1203 | downlink signal burst j with the preambles A, B, and C |
| 1204 | preamble C of the j-th downlink signal burst 1203 |
| 1205 | unit applied to calculate the movement of zero points of the channel transfer function H(j · ω, t) |
| 1206 | 1st unit applied to estimate the position of zero points of the channel transfer function H(j · ω, t) based on the preamble C of the (j − 1)-th downlink signal burst 1201 |
| 1207 | 2nd unit applied to estimate the position of zero points of the channel transfer function H(j · ω, t) based on the preamble C of the j-th downlink signal burst 1203 |
| 1208 | downlink signal burst j + 1 with the preambles A, B, and C |
| 1300 | block diagram for a mobile transmission and reception system supporting wireless communication over a multipath propagation channel 1320 by means of a pilot-assisted wireless multi-carrier system (here: an OFDM system) comprising means for a channel estimation 1318 according to the underlying invention, which can be used for an adaptive subcarrier loading |
| 1301 | OFDM transmitter |
| 1303 | channel encoder |
| 1304 | serial-to-parallel (S/P) converter |
| 1305 | OFDM modulator |
| 1306 | digital signal processor performing an Inverse Fast Fourier Transform (IFFT) |
| 1307 | digital-to-analog (D/A) converter |
| 1308 | radio frequency (RF) block |
| 1309 | transmitting (TX) antenna |
| 1310 | OFDM receiver |
| 1311 | receiving (RX) antenna |
| 1312 | radio frequency (RF) block |
| 1313 | analog-to-digital (A/D) converter |
| 1314 | digital signal processor performing a Fast Fourier Transform (FFT) |
| 1315 | OFDM demodulator |
| 1316 | parallel-to-serial (P/S) converter |
| 1317 | channel decoder |
| 1318 | channel estimator |
| 1319 | central processing unit (CPU) |
| 1320 | multipath propagation channel, characterized by a severe frequency-selective fading and a time-variant behavior |
| 1321 | zero estimator |
| A | position of the i-th zero point $T_{i,j-1}$ of the channel transfer function H(s, t) on an s-plane obtained for the (j − 1)-th downlink signal burst, which corresponds to a certain notch on the amplitude response |H(j · ω, t)| of the channel transfer function H(j · ω, t) at the discrete time j − 1 |
| B | position of the i-th zero point $T_{i,j}$ of the channel transfer function H(s, t) on an s-plane obtained for the j-th downlink signal burst, which corresponds to a certain notch on the amplitude response |H(j · ω, t)| of the channel transfer function H(j · ω, t) at the discrete time j |
| C | position of the i-th zero point $T_{i,j+1}$ of the channel transfer function H(s, t) on an s-plane obtained for the (j + 1)-th downlink signal burst, which corresponds to a certain notch on the amplitude response |H(j · ω, t)| of the channel transfer function H(j · ω, t) at the discrete time j + 1 |

The invention claimed is:

1. A method for an adaptive subcarrier loading for a mobile receiver in a wireless communication system based on Orthogonal Frequency Division Multiplexing (OFDM), the method applied to predict a frequency-selective distortion of a second channel transfer function for a multipath propagation channel impaired by attenuation fades and a time-variant behavior when said mobile receiver is moved, the method comprising:
   estimating a first and second channel transfer functions for a received signal;
   assigning a subcarrier to the mobile receiver based on the estimated first and second channel transfer functions; and
   assigning a modulation scheme to the subcarrier by estimating a subsequent channel transfer function for a subsequent received signal, wherein the estimating the subsequent channel transfer function includes predicting a movement of a plurality of zero points based on the estimated first and second channel transfer functions.

2. The method according to claim 1, wherein said assigning includes determining said plurality of zero points of the estimated channel transfer function estimated by detecting a position of notches on an associated amplitude response of the channel transfer function caused by a frequency-selective fading whose depths are larger than a predefined threshold.

3. The method according to claim 1, further comprising:
   extending the OFDM symbol stream of an associated downlink signal burst by multiplexing one preamble frame after a predefined number of OFDM data symbols within the associated downlink signal burst.

4. The method according to claim 1, further comprising:
   continually improving channel estimates during the reception of the OFDM symbol stream by weighing previously obtained channel estimates in order to reduce the effect of noise on the channel estimation.

5. The method according to claim 1, further comprising:
   scrambling reference symbols transmitted by pilot patterns by a pseudo-noise scrambling sequence generated by a generator polynomial, which is known to the mobile transmitter and the mobile receiver, in order to randomize the reference symbols to be transmitted.

6. A computer-readable recording medium for storing therein a computer program that includes instructions which when executed on a mobile receiver cause the receiver to perform the method according to claim 1.

7. A method for determining a modulation scheme for a mobile transmitter in a wireless communication system based on Orthogonal Frequency Division Multiplexing (OFDM) in combination with an adaptive subcarrier loading technique which can be applied to predict a frequency-selective distortion of a channel transfer function for a multipath propagation channel impaired by attenuation fades and a time-variant behavior comprising a mobile receiver that includes each downlink signal burst, the method comprising:
   performing a first channel estimation with a first preamble frame that serves as a pilot pattern for a current downlink signal burst, and finding a plurality of zero points of an estimated channel transfer function by detecting a position of notches on an associated amplitude response characteristic of the estimated channel transfer function,
   performing a second channel estimation with a second preamble frame that serves as a pilot pattern for a succeeding downlink signal burst, and finding said plurality of zero points of a newly estimated channel transfer function by detecting a position of notches on an associated amplitude response characteristic of the newly estimated channel transfer function,
   predicting a movement of said plurality of zero points of said channel transfer function with results obtained from the first and second channel estimations, and
   assigning a modulation scheme based on a position and movement of said plurality of zero points of the estimated channel transfer function.

8. The method for determining a modulation scheme for wireless communication with at least one mobile terminal and at least one access point according to claim 7, upon transmission of a downlink signal from the access point to the mobile terminal, further comprises:
   receiving the downlink signal of the access point at the mobile terminal,
   estimating the transfer function of the multipath propagation channel,
   estimating a position of one of said plurality of zero points, predicting a position of a remainder of said plurality of zero points for succeeding downlink signal bursts,
   making a proposal for a modulation scheme according to said predication,
   sending the proposal to the access point,
   receiving the proposal and evaluating it at the access point,
   sending an acknowledgment message for the proposal based on setting up the modulation scheme of the downlink signal according to the proposal,
   sending the downlink signal,
   receiving the acknowledgment message for the proposal at the mobile terminal,
   setting up a modulation scheme according to the proposal, and
   receiving the downlink signal.

9. A mobile receiver for wireless communication over a mobile radio channel using Orthogonal Frequency Division Multiplexing (OFDM) systems, the mobile receiver comprising:
   a modulator/demodulator unit configured to perform an OFDM multi-carrier modulation and/or an OFDM multi-carrier demodulation,
   a channel estimation unit configured to perform a channel estimation,
   a channel equalization/synchronization unit configured to perform a channel equalization and/or a synchronization on the basis of at least one part of the received signal,
   a receiver subunit configured to perform an adaptive subcarrier loading technique of adaptively assigning a subcarrier to the mobile receiver to increase usage capacity of the underlying multipath propagation channel, the technique including,
      predicting a frequency-selective distortion of the channel transfer function for the underlying multipath propagation channel being severely impaired by attenuation fades and a time-variant behavior when the mobile receiver is moved, and
   an estimation unit configured to calculate an estimation of said channel transfer function by evaluating a position of a plurality of zero points of the channel transfer function, wherein, for each downlink signal burst,
   a first estimating unit configured to perform a first channel estimation with a first preamble frame that serves as a pilot pattern for a current downlink signal burst, and find said plurality of zero points of the estimated channel transfer function by detecting a position of notches on an associated amplitude response characteristic of the estimated channel transfer function, a second estimating unit configured to perform a second channel estimation with a second preamble frame that serves as a pilot pattern for a succeeding downlink signal burst, and find said plurality of zero points of a newly estimated channel transfer function by detecting a position of notches on an associated amplitude response characteristic of the newly estimated channel transfer function, a predicting unit configured to predict a movement of said plurality of zero points of said channel transfer function with results obtained from the first and second estimating units, and a modulator configured to assign a modulation scheme based on the position and movement of said plurality of zero points of the estimated channel transfer function.

* * * * *